(12) United States Patent
Shi et al.

(10) Patent No.: US 8,244,130 B2
(45) Date of Patent: Aug. 14, 2012

(54) PASSIVE OPTICAL NETWORK SYSTEM WITH MODE-VARIABLE OPTICAL NETWORK UNIT

(75) Inventors: Ying Shi, Beijing (CN); Hideya Yoshiuchi, Beijing (CN); Hiroki Ikeda, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1102 days.

(21) Appl. No.: 12/105,777

(22) Filed: Apr. 18, 2008

(65) Prior Publication Data

US 2009/0232495 A1 Sep. 17, 2009

(30) Foreign Application Priority Data

Apr. 19, 2007 (CN) .......................... 2007 1 0096647

(51) Int. Cl.
*H04J 14/00* (2006.01)
(52) U.S. Cl. ................ 398/67; 398/70; 398/71
(58) Field of Classification Search .................. 398/25, 398/43, 58, 63, 66–68, 70–72
See application file for complete search history.

(56) References Cited

U.S. PATENT DOCUMENTS

| 7,564,852 | B2 * | 7/2009 | Das et al. ................. 370/395.41 |
| 2004/0095884 | A1 * | 5/2004 | Lee et al. ...................... 370/235 |
| 2005/0008158 | A1 * | 1/2005 | Huh et al. ..................... 380/256 |
| 2006/0083245 | A1 * | 4/2006 | Tanaka et al. .............. 370/395.2 |
| 2007/0041384 | A1 * | 2/2007 | Das et al. ................... 370/395.4 |
| 2009/0175276 | A1 * | 7/2009 | Tsuge et al. .................. 370/392 |

OTHER PUBLICATIONS

ITU-T, G.984.3, Feb. 2004.
IEEE, Std. 802.3ah, 2004.

* cited by examiner

*Primary Examiner* — Dzung Tran
(74) *Attorney, Agent, or Firm* — Mattingly & Malur, PC

(57) ABSTRACT

An optical line terminal connecting with numbers of optical network units comprises a control unit which controls each optical network unit to make it operate in a first mode in which transmission and reception of control messages and data are possible or in a second mode in which the transmission and reception of control messages are possible but the transmission of data is impossible, according to a communication permission request transmitted from an optical network unit and based on a preset maximum number of optical network units permitted to execute upstream communication from the optical network unit to the optical line terminal.

21 Claims, 29 Drawing Sheets

| MESSAGE NAME | MESSAGE ID | MESSAGE CONTENTS |
|---|---|---|
| DOWNSTREAM | | |
| DISCOVERY | 00010000 | {T1,T2} |
| REGISTRATION ACTIVATION | 00010010 | {SN} |
| REGISTRATION DEACTIVATION | 00010011 | {SN} |
| MEMBERSHIP_ACCEPT | 00010110 | {SN,ONU-ID,T5,T6} |
| MEMBERSHIP_REJECT | 00010111 | {SN} |
| MEMBERSHIP_END | 00011000 | {T8} |
| UPSTREAM | | |
| REGISTRATION REQUEST | 00010001 | {SN} |
| MEMBERSHIP_REQUEST | 00010100 | {SN,T3,T4} |
| MEMBERSHIP_CANCEL | 00010101 | {T7} |

FIG.14

| TERMINAL SN | actTimer | MEMBERSHIP | ONU-ID | membTimer |
|---|---|---|---|---|
| 0x00-00-00-00 | 1.8s | VALID | 0x0 | 460s |
| 0x00-00-00-01 | 2s | VALID | 0x1 | 600s |
| 0x00-00-00-02 | 0.2s | VALID | 0x2 | 4s |
| 0x00-00-00-03 | 1.2s | INVALID | 0xfe | 0 |
| ... | ... | ... | ... | ... |
| 0x00-ff-ff-ff | 0.5s | INVALID | 0xfe | 0 |

FIG.16

| TERMINAL SN | actTimer | MEMBERSHIP | ONU-ID | membTimer | PRIORITY |
|---|---|---|---|---|---|
| 0x00-00-00-00 | 1.8s | VALID | 0x0 | 460s | HIGH |
| 0x00-00-00-01 | 2s | VALID | 0x1 | 600s | HIGH |
| 0x00-00-00-02 | 0.2s | VALID | 0x2 | 4s | MIDDLE |
| 0x00-00-00-03 | 1.2s | INVALID | 0xfe | 0 | LOW |
| ... | ... | ... | ... | ... | ... |
| 0x00-ff-ff-ff | 0.5s | INVALID | 0xfe | 0 | MIDDLE |

FIG.19

| TERMINAL SN | TERMINAL TYPE | actTimer | MEMBERSHIP | ONU-ID | membTimer |
|---|---|---|---|---|---|
| 0x00-00-00-00 | ONU | N/A | VALID | 0x0 | N/A |
| 0x00-00-00-01 | ONU | N/A | VALID | 0x1 | N/A |
| 0x00-00-00-02 | ONU | N/A | VALID | 0x2 | N/A |
| 0x00-00-00-03 | ONU | N/A | VALID | 0x3 | N/A |
| ⋮ | | ⋮ | ⋮ | ⋮ | ⋮ |
| 0x00-ff-ff-ff | ONU | N/A | VALID | 0x2f | N/A |
| 0x01-00-00-00 | SORU | 1.2s | VALID | 0x30 | 30s |
| 0x01-00-00-01 | SORU | 2s | VALID | 0x31 | 240s |
| ⋮ | | ⋮ | ⋮ | ⋮ | ⋮ |
| 0xff-ff-ff-ff | SORU | 0.5s | INVALID | 0xfe | 0 |

FIG.28

| PORT | TERMINAL SN | TERMINAL TYPE | regTimer | ONU-ID | membTimerU |
|---|---|---|---|---|---|
| 0 | 0x00-00-00-00-00 | ONU | N/A | 0x0 | N/A |
| 1 | 0x00-00-00-00-01 | SORU | 2s | 0x1 | 600s |
| 2 | 0x00-00-00-00-02 | SORU | 0.2s | 0x2 | 4s |
| 3 | 0x00-00-00-00-03 | SORU | 1.2s | 0xfe | 0 |

PASSIVE OPTICAL NETWORK SYSTEM WITH MODE-VARIABLE OPTICAL NETWORK UNIT

INCORPORATION BY REFERENCE

The present application claims priority from Chinese application P200710096647.9 filed on Apr. 19, 2007, the content of which is hereby incorporated by reference into this application.

BACKGROUND OF THE INVENTION

The present invention relates to a passive optical network system, and in particular, to a mode-variable optical network unit and its method in an extended passive optical network.

In a conventional passive optical network system, the number of optical network units is physically restricted by an optical split ratio (1:32, 1:64, 1:128, etc.) while also being logically restricted by the layer 2 protocol. This is because an optical line terminal is incapable of handling too many optical network units at the same time. For example, in a gigabit passive optical network in conformity with the standard of ITU-T (International Telecommunication Union-Telecommunication Standardization Sector), the maximum number of online users is restricted to 128 (see ITU-T Recommendation G.984). Thus, it becomes necessary to connect a lot of users to one optical network unit via gateways by the FTTN (Fiber To The Node) system and thereby share a wide bandwidth efficiently, but with limited connection distance and flexibility, or additional optical line terminals and optical fibers have to be added, result in increasing costs.

SUMMARY OF THE INVENTION

The present invention realizes an increase in the number of online terminals supported by one optical line terminal, an increase in the number of users, and enlargement of the covered area, by providing a mode-variable optical network unit, an optical line terminal, a passive optical network system and a method for dynamically assigning membership to the users.

In accordance with an aspect of the present invention, there is provided an optical line terminal connecting with numbers of optical network units. The optical network units are connectable to the optical line terminal even when the number of optical network units connected to the optical line terminal exceeds a number preset to the optical line terminal as the maximum number of optical network units permitted to execute upstream communication from the optical network unit to the optical line terminal. The optical line terminal comprises a control unit which controls each optical network unit to make it operate in a first mode in which transmission and reception of control messages and data are possible or in a second mode in which the transmission and reception of control messages are possible but the transmission of data is impossible, according to a communication permission request transmitted from an optical network unit and based on the maximum number of optical network units permitted to execute the upstream communication.

In accordance with another aspect of the present invention, there is provided an optical network unit to be connected to an optical line terminal. The optical network unit is connectable to the optical line terminal even when the number of optical network units connected to the optical line terminal exceeds a number preset to the optical line terminal as the maximum number of optical network units permitted to execute upstream communication from the optical network unit to the optical line terminal. The optical network unit comprises a control unit which controls the optical network unit to make it operate in a first mode in which transmission and reception of control messages and data are possible or in a second mode in which the transmission and reception of control messages are possible but the transmission of data is impossible, according to a response which is made by the optical line terminal to a communication permission request from the optical network unit based on the maximum number of optical network units permitted to execute the upstream communication.

In accordance with another aspect of the present invention, there is provided an optical line terminal connecting with numbers of optical network units, comprising: a network interface connecting with optical network units exceeding a number preset to the optical line terminal as the maximum number of optical network units permitted to execute upstream communication from the optical network unit to the optical line terminal; and a control unit which generates a communication permission response message, indicating whether communication by an optical network unit is permitted or not, when a communication permission request message and an optical network unit serial number are received from the optical network unit. The network interface transmits the communication permission response message to the optical network unit transmitting the communication permission request message.

In accordance with another aspect of the present invention, there is provided an optical network system comprising an optical line terminal, an optical network unit and an optical link connecting the optical line terminal and the optical network unit. The optical network unit is connectable to the optical line terminal even when the number of optical network units connected to the optical line terminal exceeds a number preset to the optical line terminal as the maximum number of optical network units permitted to execute upstream communication from the optical network unit to the optical line terminal. The optical line terminal includes a control unit which controls the optical network unit to make it operate in a first mode in which transmission and reception of control messages and data are possible or in a second mode in which the transmission and reception of control messages are possible but the transmission of data is impossible, according to a communication permission request transmitted from the optical network unit and based on the maximum number of optical network units permitted to execute the upstream communication. The optical network unit includes a control unit which controls the optical network unit to make it operate in the first mode or in the second mode according to a response which is made by the optical line terminal to the communication permission request from the optical network unit based on the maximum number of optical network units permitted to execute the upstream communication.

In accordance with another aspect of the present invention, there is provided a video service system comprising a video server, an optical line terminal, an optical network unit, an optical receiver unit and an optical link. The optical network unit operates in a first mode in which transmission and reception of control messages and data are possible. The optical receiver unit is capable of operating either in the first mode or in a second mode in which the transmission and reception of control messages and the reception of data are possible but the transmission of data is impossible. The optical receiver unit receives video service from the video server via the optical line terminal. The optical receiver unit is connectable to the optical line terminal even when the number of optical receiver units connected to the optical line terminal exceeds a number preset to the optical line terminal as the maximum number of optical receiver units permitted to execute upstream communication from the optical receiver unit to the optical line terminal. The optical line terminal includes a control unit which controls the optical receiver unit to make it operate in a first mode in which transmission and reception of control messages and data are possible or in a second mode in which the transmission and reception of control messages and the reception of data are possible but the transmission of data is impossible, according to a communication permission request transmitted from the optical receiver unit and based on the maximum number of optical receiver units permitted to execute the upstream communication. The optical receiver unit includes a control unit which controls the optical receiver unit to make it operate in a first mode in which transmission and reception of control messages and data are possible or in a second mode in which the transmission and reception of control messages and the reception of data are possible but the transmission of data is impossible, according to a response which is made by the optical line terminal to the communication permission request from the optical receiver unit based on the maximum number of optical receiver units permitted to execute the upstream communication.

In accordance with another aspect of the present invention, there is provided an optical communication method for an optical network system including an optical line terminal, an optical network unit and an optical link connecting the optical line terminal and the optical network unit. The optical network unit is connectable to the optical line terminal even when the number of optical network units connected to the optical line terminal exceeds a number preset to the optical line terminal as the maximum number of optical network units permitted to execute upstream communication from the optical network unit to the optical line terminal. The optical line terminal controls the optical network unit to make it operate in a first mode in which transmission and reception of control messages and data are possible or in a second mode in which the transmission and reception of control messages are possible but the transmission of data is impossible, according to a communication permission request transmitted from the optical network unit and based on the maximum number of optical network units permitted to execute the upstream communication.

BRIEF DESCRIPTION OF THE DRAWINGS

FIG. 14 is a table showing an example of a terminal table of the optical line terminal.

FIG. 16 is a table showing another example of the terminal table of the optical line terminal.

FIG. 19 is a table showing an example of the terminal table of the optical line terminal in accordance with the second embodiment of the present invention.

FIG. 28 is a table showing an example of a user terminal table of the optical network unit in accordance with the fourth embodiment of the present invention.

DETAILED DESCRIPTION OF THE INVENTION

Figure 1:
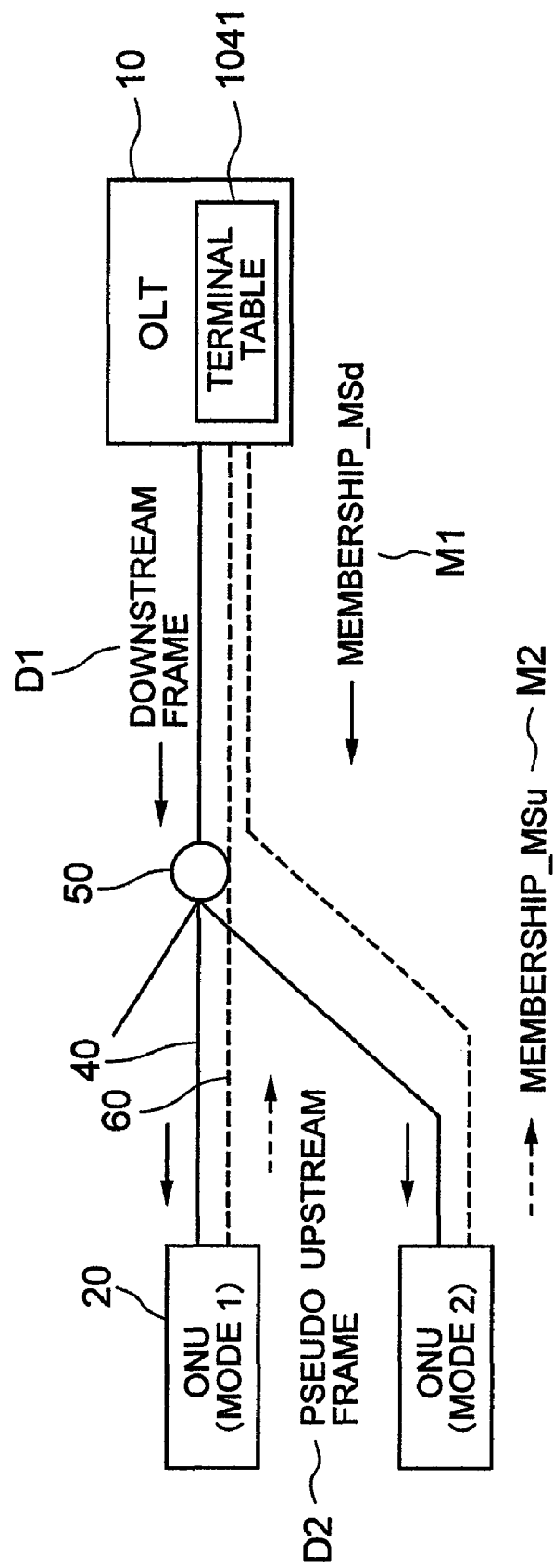
FIG. 1 is a schematic diagram showing a passive optical network system including mode-variable optical network units in accordance with a first embodiment of the present invention.

Referring now to the drawings, a description will be given in detail of preferred embodiments in accordance with the present invention.

Embodiment 1

FIG. 1 is a schematic diagram showing a passive optical network system including mode-variable optical network units. The passive optical network system of FIG. 1 includes an optical line terminal 10, numbers of optical network units 20, an optical splitter 50, optical fiber links 40 and pseudo links 60. The optical line terminal 10, which is equipped with a terminal table 1041, transmits membership downstream messages M1 and downstream (DS) frames D1 and receives membership upstream messages M2 and pseudo upstream (US) frames D2. Meanwhile, each optical network unit 20, which is capable of operating in either mode1 or mode2, receives the membership downstream messages M1 and the downstream frames D1 and transmits the membership upstream messages M2 and the pseudo upstream frames D2. The optical fiber links 40 and the optical splitter 50 connect the optical line terminal 10 with the optical network units 20 in the tree topology, carrying the membership downstream messages M1 and the downstream frames D1. The pseudo links 60 connect the optical line terminal 10 with the optical network units 20 by the tree topology, carrying the membership upstream messages M2 and the pseudo upstream frames D2.

In the passive optical network system of FIG. 1, a large number of optical network units 20 can be connected to the optical line terminal 10. The number of the optical network units 20 connected to the optical line terminal 10 may exceed a permissible number of connections which has been preset to the optical line terminal 10. In FIG. 1, only two optical network units 20 (operating in mode1 and in mode2, respectively) are shown for simplicity of illustration. Each optical network unit 20 is capable of transmitting the membership upstream message M2 to the optical line terminal 10 and thereby originating the alteration of its own membership. The optical line terminal 10 is capable of determining the membership of the optical network unit 20, transmitting the membership downstream message M1 to the optical network unit 20 to notify it of its membership, and storing membership parameters of the optical network unit 20 in the terminal table 1041. The pseudo links 60 may either be implemented by the optical fiber links 40 or other communication links (air interface, copper line interface, etc., for example). Correspondingly, the pseudo upstream frame D2 may either be an ordinary passive optical network upstream frame (non-patent reference: ITU-T Recommendation G.984.3) or an upstream frame of a different type, for example.

Figure 2:
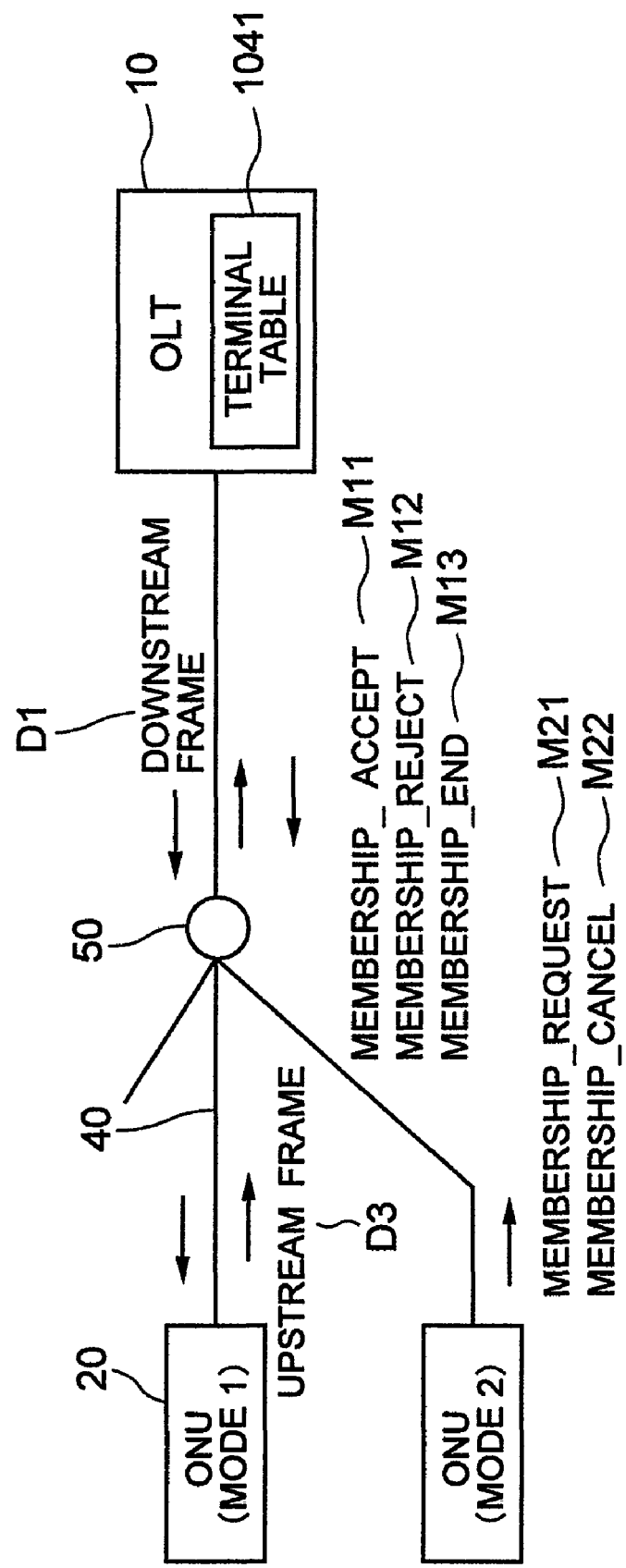
FIG. 2 is a schematic diagram showing message exchange between an optical line terminal and optical network units when the operation mode of an optical network unit is changed in accordance with the first embodiment of the present invention.

FIG. 2 is a schematic diagram showing message exchange between the optical line terminal 10 and the optical network units 20 when the operation mode of an optical network unit 20 in accordance with the first embodiment of the present invention is changed. The passive optical network system shown in FIG. 2 includes the optical line terminal 10 having the terminal table 1041, the optical network units 20 capable of operating in either mode1 or mode2, and the optical fiber links 40 and the optical splitter 50 connecting the optical line terminal 10 with the optical network units 20 by the tree topology. Each optical network unit 20 is capable of requesting its membership by transmitting a membership request message M21 to the optical line terminal 10, while also being capable of canceling its membership by transmitting a membership cancellation message M22 to the optical line terminal 10 (see detailed sequences shown in FIGS. 7 and 8). Meanwhile, the optical line terminal 10 is capable of accepting a membership application included in the membership request message M21 from an optical network unit 20 by transmitting a membership acceptance message M11 to the optical network unit 20, rejecting the membership application by transmitting a membership rejection message M12 to the optical network unit 20, and terminating the current membership of an optical network unit 20 by transmitting a membership termination message M13 to the optical network unit 20. Each optical network unit 20 operates in mode1 when its membership is valid, while operating in mode2 when its membership is invalid (see detailed states shown in FIG. 13).

Figure 3:
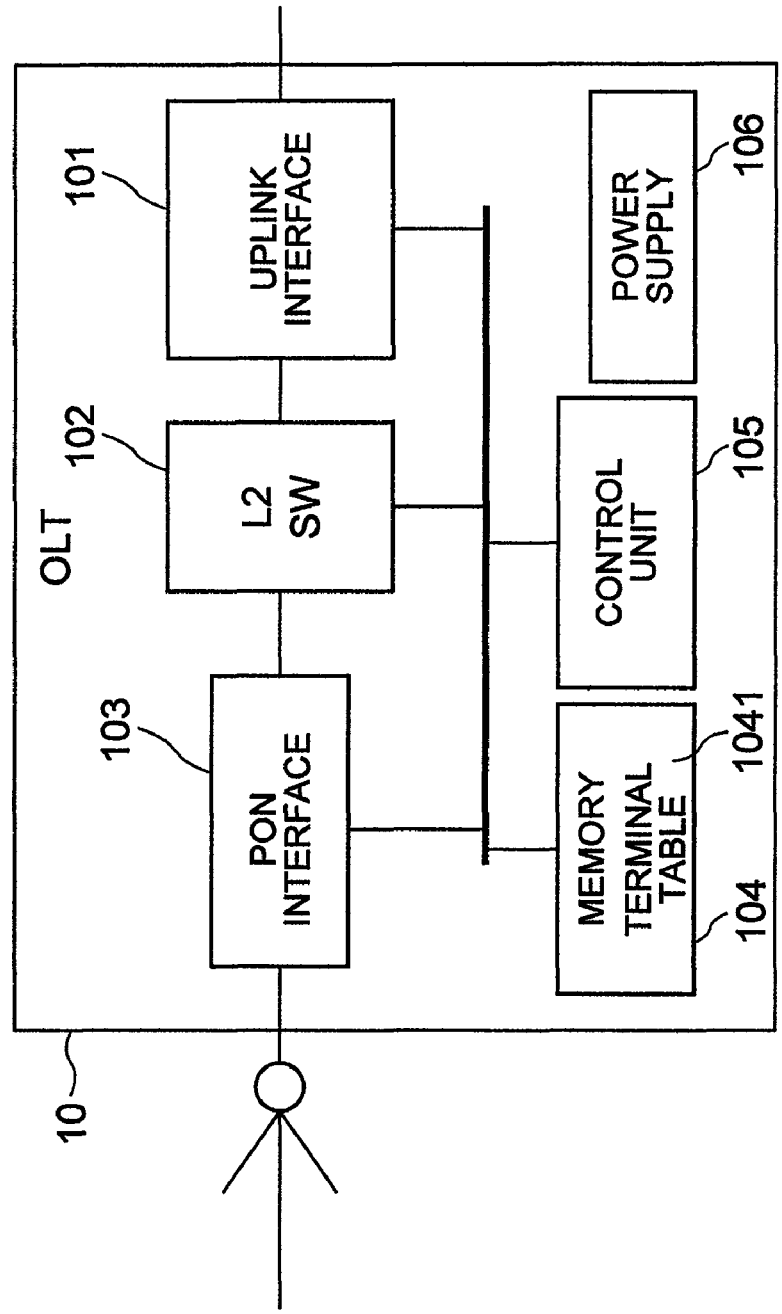
FIG. 3 is a block diagram of the optical line terminal in accordance with the first embodiment of the present invention.

FIG. 3 is a block diagram of the optical line terminal 10 in accordance with the first embodiment of the present invention. The optical line terminal 10 includes an uplink interface 101 for the communication with the service side (service terminal), a layer 2 switch (L2SW) 102 for the exchange of upstream/downstream data, a PON (Passive Optical Network) interface 103 which is connected to the optical fiber links 40 to communicate with the optical network units 20 connected to the links 40, a memory unit 104 including the terminal table 1041 storing the membership parameters of the optical network units 20, a control unit 105 for controlling the operation of the other units/modules of the optical line terminal 10 (transmission of the membership acceptance message M11, update of the terminal table 1041, etc.), and a power supply 106 for supplying electric power to the units/modules.

Figure 4:
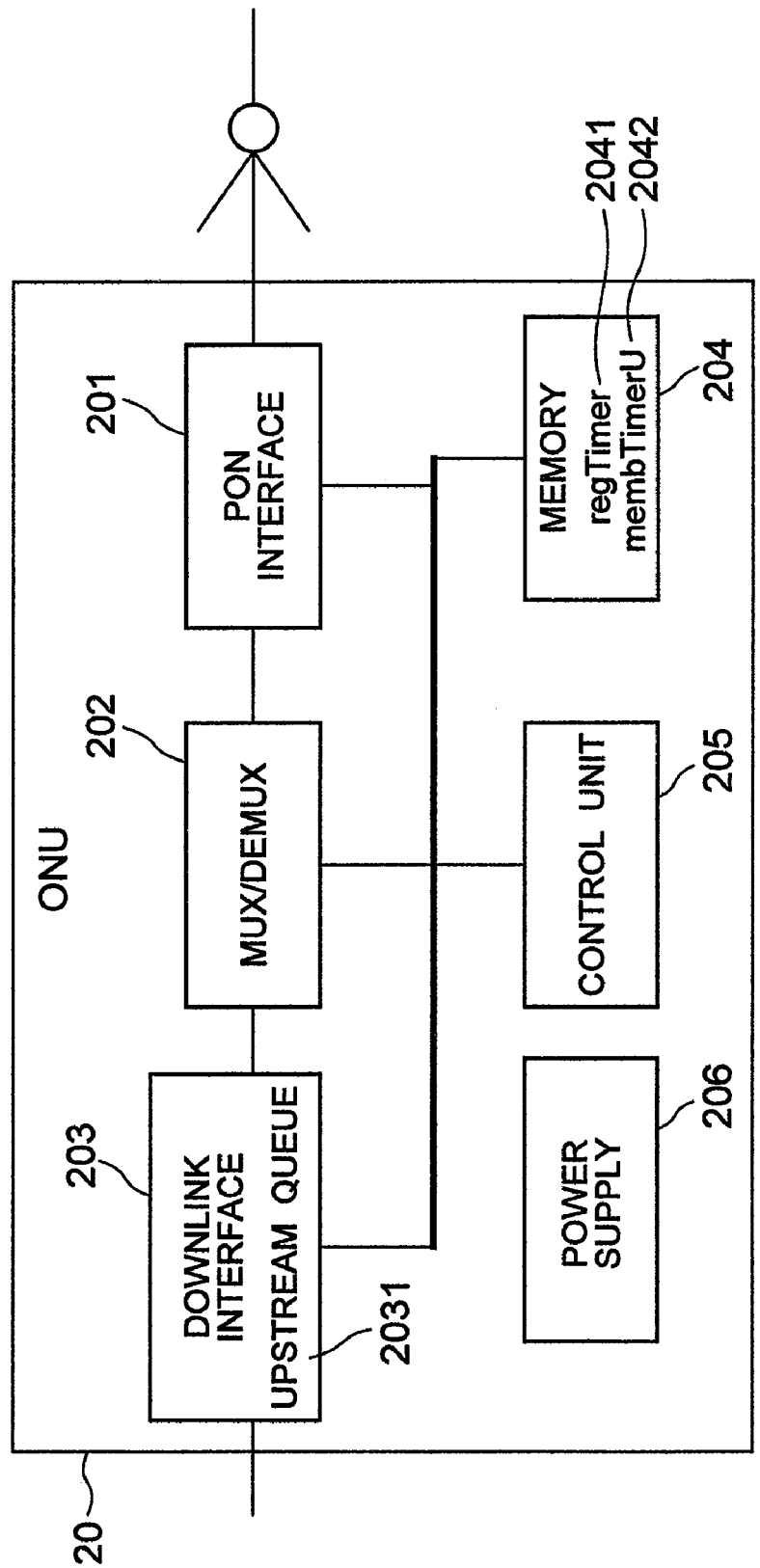
FIG. 4 is a block diagram of the optical network unit in accordance with the first embodiment of the present invention.

FIG. 4 is a block diagram of the optical network unit 20 in accordance with the first embodiment of the present invention. The optical network unit 20 includes a PON interface 201 connected to the optical fiber link 40 to communicate with the optical line terminal 10 connected to the optical fiber link 40, a multiplexer/demultiplexer unit (MUX/DEMUX) 202 for multiplexing/demultiplexing the upstream/downstream data, a downlink interface 203 including an upstream queue 2031 (as the buffer for the upstream data) and communicating with the user side (user terminal), a memory unit 204 including a regTimer 2041 for distinguishing whether the activation of the optical network unit 20 is valid or not and a membTimerU 2042 for distinguishing whether the membership of the optical network unit 20 is valid or not, a control unit 205 for controlling the operation of the other units/modules of the optical network unit 20 (transmission of the membership request message M21, update of the membTimerU 2042, etc.), and a power supply 206 for supplying electric power to the units/modules.

Figure 5:
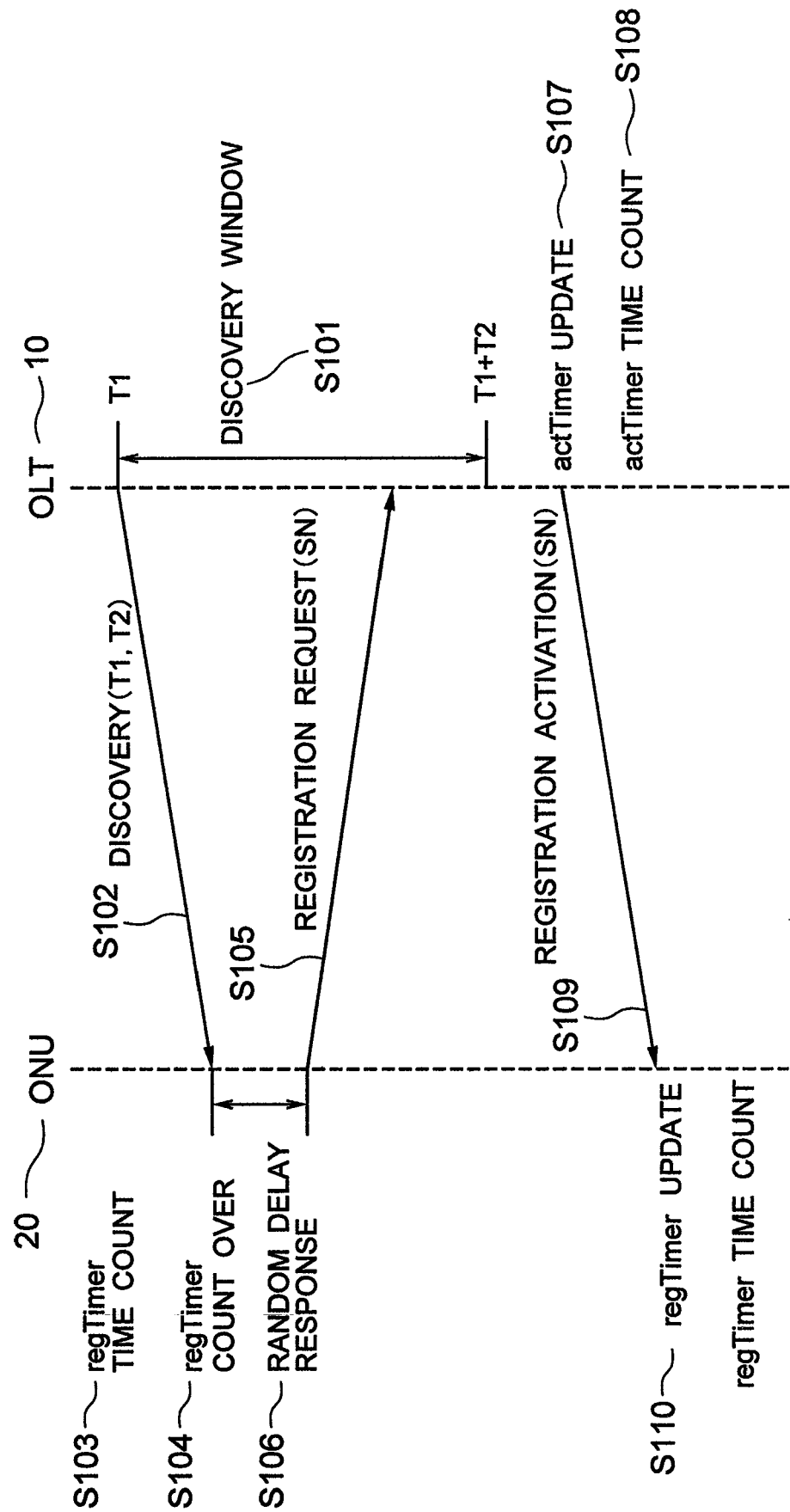
FIG. 5 is a time sequence diagram showing a case where the optical line terminal maintains connection with an optical network unit operating in mode2.
Figure 6:
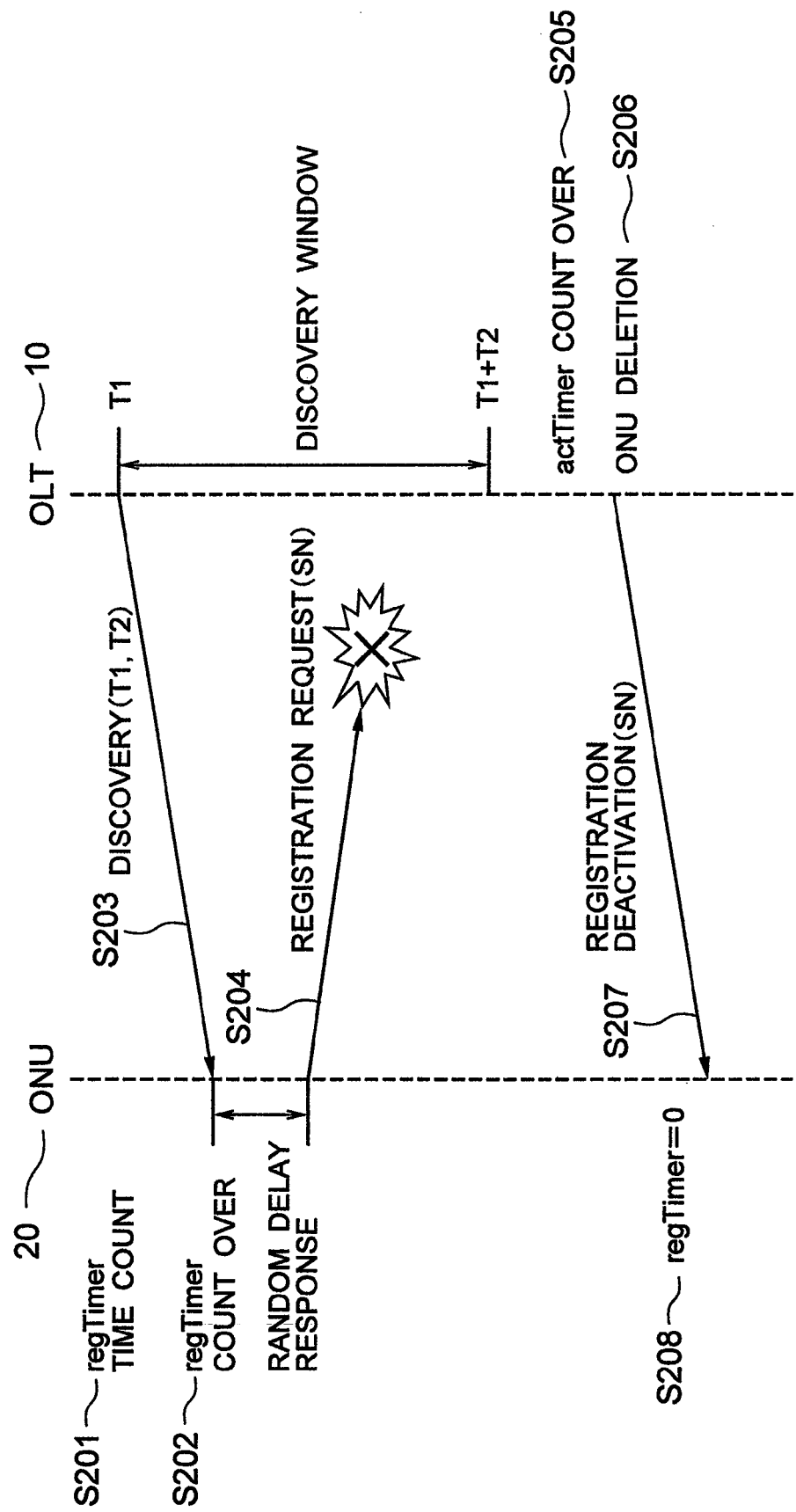
FIG. 6 is a time sequence diagram showing a case where the optical line terminal loses connection with an optical network unit operating in mode2.

FIGS. 5 and 6 show periodic message exchange processes which are executed between the optical line terminal 10 and an optical network unit 20 when the optical network unit 20 operates in mode2.

FIG. 5 is a time sequence diagram showing a case where the optical line terminal 10 maintains connection with an optical network unit 20 operating in mode2. As mentioned above, the optical network unit 20 operates in mode2 when its membership is valid (see detailed states shown in FIG. 13). During the mode2 operation, the optical network unit 20 maintains its active state by successively executing message exchange with the optical line terminal 10 in discovery windows (S101, non-patent reference: ITU-T Recommendation G.984.3). The optical line terminal 10 periodically originates the discovery window ("T1" represents the start time of the next discovery window and "T2" represents its duration) by transmitting a discovery window (S102). Between two consecutive discovery windows, the optical network unit 20 makes the regTimer 2041 count the time (S103). When the regTimer 2041 finishes counting (COUNT OVER), the optical network unit 20 makes response to the next (subsequently received) discovery message by transmitting a registration request message (S105) after a random delay (S106). Here, a serial number (SN) is used for identification and the aforementioned random delay is used for avoiding collision between different optical network units 20 (i.e. collision of messages from different optical network units 20). Upon reception of the registration request message, the optical line terminal 10 updates (initializes) an "actTimer" in the terminal table 1041 (S107, see detailed contents of a table of FIG. 14), newly starts the time count by the actTimer (S108), and transmits a registration activation message (S109). The optical network unit 20 receiving the registration activation message from the optical line terminal 10 updates (initializes) the regTimer 2041 (S110). By repeating the above process, the optical line terminal 10 maintains the connection with the optical network unit 20 operating in mode2. In a preferred embodiment in accordance with the present invention, the updated values (initial values) of the regTimer 2041 and the actTimer were set at 10 times the repetition cycle of the discovery windows originated by the optical line terminal 10, by which the collision between different optical network units 20 was avoided successfully (since only 1/10 of the optical network units 20 make the response in each discovery window on average).

FIG. 6 is a time sequence diagram showing a case where the optical line terminal 10 loses connection with an optical network unit 20 operating in mode2. The optical network unit 20 makes the regTimer 2041 continue counting the time (S201) until the time count by the regTimer 2041 is over (COUNT OVER) (S202). When the next discovery message is received (S203), the optical network unit 20 makes response to the discovery message by transmitting the registration request message, in which the serial number (SN) is used for identification (S204). However, there are cases where the registration request message can disappear due to network congestion, etc. and the optical line terminal 10 can not successfully receive the registration request message before the expiration (COUNT OVER) of the actTimer (S205). In such cases, the optical line terminal 10 loses connection with the optical network unit 20, deletes the optical network unit 20 from the terminal table 1041, and broadcasts a registration deletion message (registration deactivation message) (S207). In the registration deletion message, a serial number (SN) is used for the identification of the deleted optical network unit 20. Upon reception of the registration deletion message, the optical network unit 20 recognizes its loss of connection by checking the serial number (SN), and sets the regTimer 2041 to 0 to let it indicate the loss of connection (S208).

Figure 7:
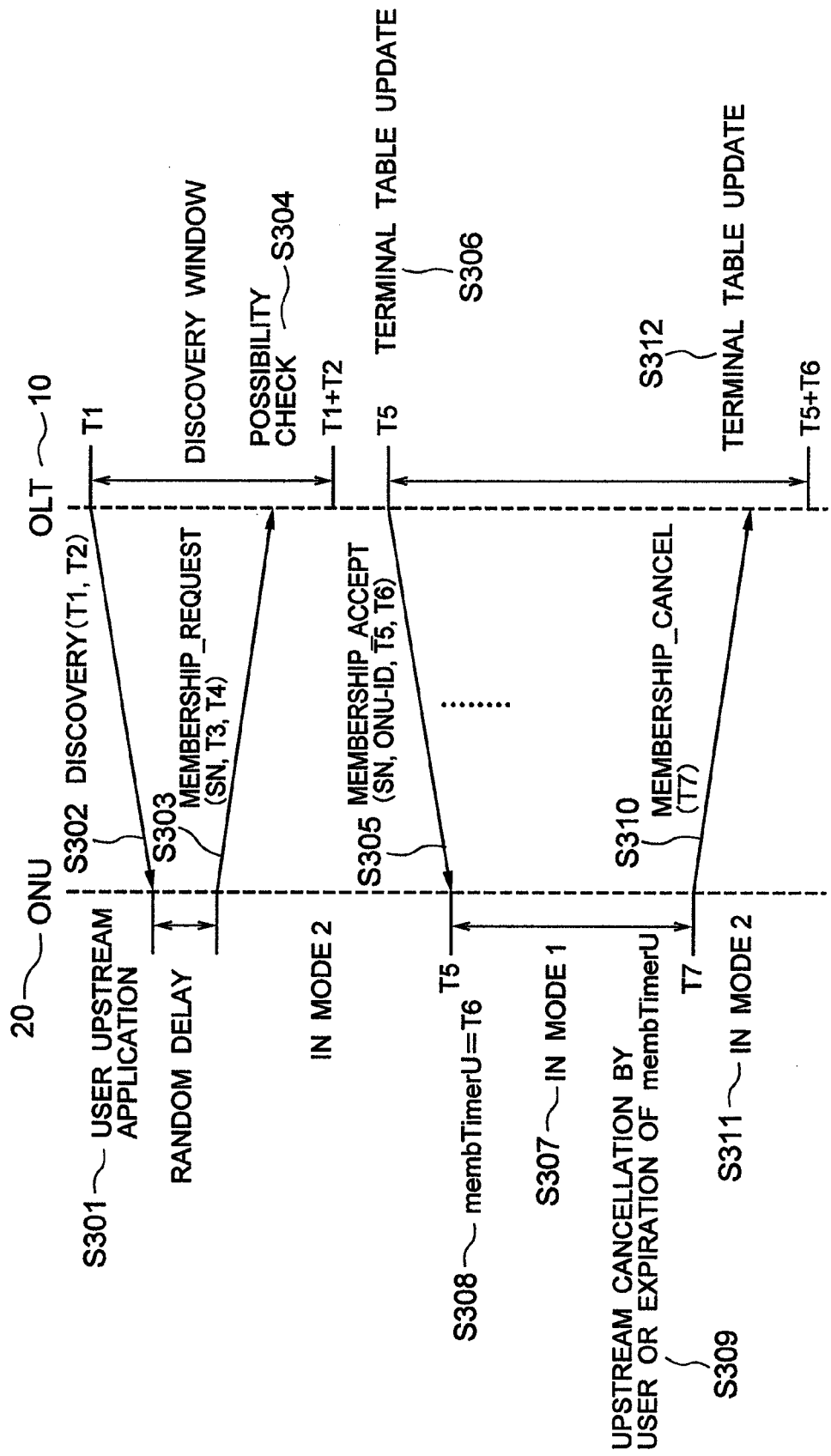
FIG. 7 is a time sequence diagram showing application (request) for membership by an optical network unit, cancellation of the membership by the optical network unit, and corresponding membership assignment by the optical line terminal.
Figure 8:
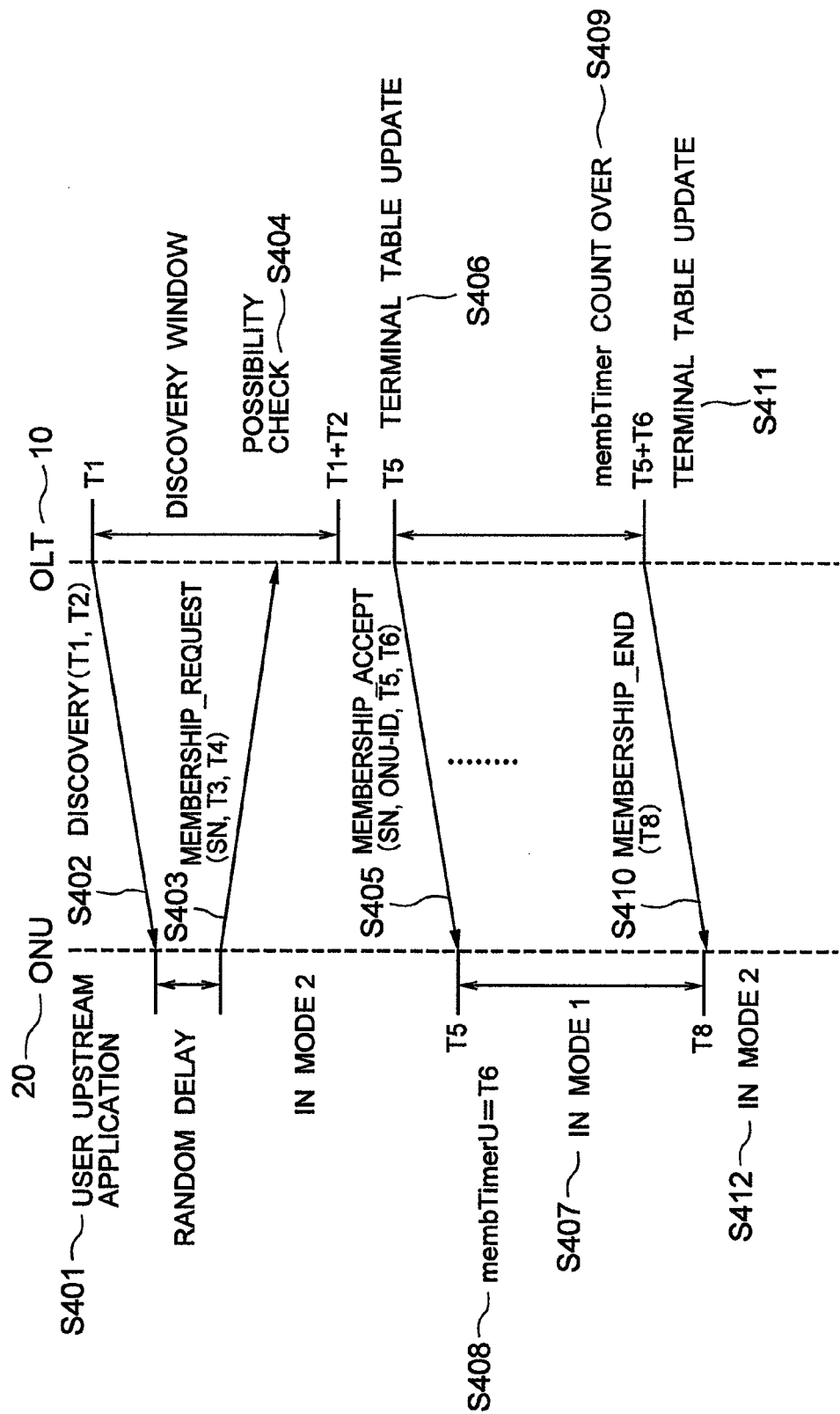
FIG. 8 is a time sequence diagram showing the membership application by an optical network unit and corresponding membership assignment/termination by the optical line terminal.

FIGS. 7 and 8 show message exchange processes which are executed between the optical line terminal 10 and an optical network unit 20 when the operation mode of the optical network unit 20 is changed.

FIG. 7 is a time sequence diagram showing the application (request) for the membership by an optical network unit 20, the cancellation of the membership by the optical network unit 20, and corresponding membership assignment by the optical line terminal 10. When the optical network unit 20 finds that a user is making an upstream application (by detecting that the length of the upstream queue 2031 has exceeded a preset threshold length Lth, for example) (S301), the optical network unit 20 makes response to a subsequently received discovery message (S302) by transmitting the membership request message M21 (S303). In the membership request message M21, a serial number (SN) is used for identification, "T3" represents the start time of the membership request, and "T4" represents the duration of the membership request (T4 is a preset value in a preferred embodiment). Upon reception of the membership request message M21, the optical line terminal 10 checks the possibility of new membership assignment (S304) by referring to the terminal table 1041. Specifically, when the number of optical network units 20 having valid membership in the terminal table 1041 is smaller than a preset maximum number (Nmax) of members (see a detailed flow chart of FIG. 11), the optical line terminal 10 assigns the membership to the requesting optical network unit 20 by transmitting the membership acceptance message M11 (S305). In the membership acceptance message M11, a serial number (SN) is used for the identification of the requesting optical network unit 20, an ONU-ID represents an ID newly assigned to the requesting optical network unit 20 (valid for the validity period of the assigned membership), "T5" represents the start time of the assigned membership, and "T6" represents the duration of the assigned membership. Under normal conditions, T5 and T6 are set to be equivalent to T3 and T4, respectively. However, T5 and T6 may be set differently when the optical line terminal 10 is incapable of satisfactorily handling the optical network unit 20.

On the other hand, when the number of optical network units 20 having valid membership in the terminal table 1041 is Nmax or more, the optical line terminal 10 rejects the application from the optical network unit 20 by transmitting the membership rejection message M12. In the membership rejection message M12, a serial number (SN) represents the requesting optical network unit 20. At the same time, the optical line terminal 10 updates corresponding membership in the terminal table 1041 to "valid", sets a corresponding ONU-ID to a newly assigned ONU-ID, sets a corresponding membTimer as a validity time (see detailed contents of the table of FIG. 14) at the smaller one selected from T4 and a preset maximum time Tmax (S306).

The optical network unit 20 receiving the membership acceptance message M11 from the optical line terminal 10 starts operating in mode1 from the start time T5 specified in the message M11 (S307) and sets the membTimerU 2042 at T6 (S308). Incidentally, it should be noted that discrimination processes such as ranging and bandwidth assignment should be started and maintained when the optical network unit 20 operates in mode1 (non-patent reference: ITU-T Recommendation G.984.3, IEEE 802.3ah). When the membTimerU 2042 finishes counting (COUNT OVER) or the optical network unit 20 finds upstream cancellation by the user (by checking the upstream queue 2031 and detecting that an idle time exceeding a preset threshold time period is being maintained, for example) (S309), the optical network unit 20 cancels its membership by transmitting the membership cancellation message M22 (in which "T7" represents the time of the cancellation) (S310), starts operating in mode2 (S311), and thereafter maintains the mode2 operation until the next membership assignment. Upon reception of the membership cancellation message M22, the optical line terminal 10 updates the terminal table 1041 (S312), sets the corresponding membership to "invalid", sets the corresponding ONU-ID to "0xfe" (used for all optical network units 20 operating in mode2), and sets a corresponding membTimer to 0.

FIG. 8 is a time sequence diagram showing the membership application by an optical network unit 20 and corresponding membership assignment/termination by the optical line terminal 10. When an upstream application by a user is found by the aforementioned method (S401), the optical network unit 20 makes response to a subsequently received discovery message (S402) by transmitting the membership request message M21 (S403). Upon reception of the membership request message M21, the optical line terminal 10 checks the possibility of new membership assignment (S404) by referring to the terminal table 1041. Similarly to the case of FIG. 7, the optical line terminal 10 in FIG. 8 assigns the membership to the optical network unit 20 by transmitting the membership acceptance message M11 (S405) or rejects the application by transmitting the membership rejection message M12 and updates the terminal table 1041 correspondingly (S406). When the membership acceptance message M11 is received from the optical line terminal 10, the optical network unit 20 starts operating in mode1 from the start time T5 specified in the message M11 (S407) and sets the membTimerU 2042 at T6 (S408). When the membTimer in the terminal table 1041 finishes counting (COUNT OVER) (S409), the optical line terminal 10 terminates the membership of the optical network unit 20 by transmitting the membership termination message M13 (in which "T8" represents the time of the termination) (S410), updates the terminal table 1041 (S411), sets the corresponding membership to "invalid", sets the corresponding ONU-ID to "0xfe", and sets the corresponding membTimer to 0. The optical network unit 20 receiving the membership termination message M13 starts operating in mode2 (S412) and thereafter maintains the mode2 operation until the next membership assignment.

Figures 9, 10:
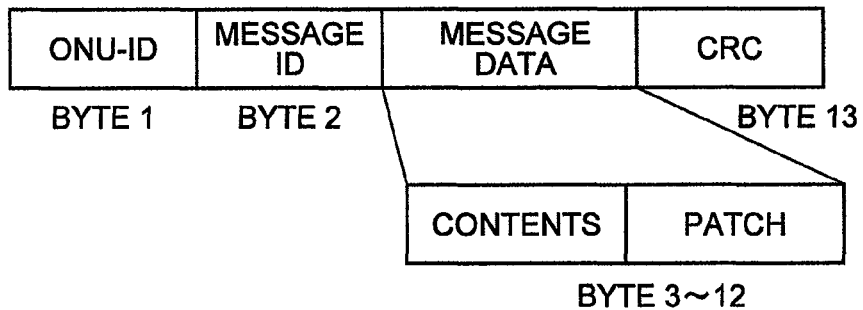
FIG. 9 is a schematic diagram showing the structure of a membership downstream/upstream message.
FIG. 10 is a table showing the definition of message IDs and the contents of particular messages.

FIG. 9 is a schematic diagram showing the structure of the membership downstream/upstream message. FIG. 10 is a table showing the definition of message IDs and the contents of particular messages. In accordance with the first embodiment of the present invention, the membership downstream message and the membership upstream message have the same structure compatible with the ITU-T gigabit passive optical network (GPON) (non-patent reference: ITU-T Recommendation G.984.3) and each message includes the ONU-ID (1 byte), the message ID (1 byte), message data (10 bytes) and a CRC (Cyclic Redundancy Check) code (1 byte) as shown in FIG. 9. The message data (total size: 10 bytes) includes message contents (1-10 bytes) and a patch (1-10 bytes). It should be noted that the message structure is not necessarily restricted to that of FIG. 9. For example, in application to an Ethernet passive optical network (EPON), a control frame (size: 64 bytes) is used as each message. As shown in FIG. 10, the message IDs of the discovery message, the registration activation message, the registration activation cancellation message (registration deletion message), the membership acceptance message M11, the membership rejection message M12, the membership termination message M13, the registration request message, the membership request message M21 and the membership cancellation message M22 are "00010000", "100010010", "000100111", "00010110", "00010111", "00011000", "00010001", "00010100" and "00010101", respectively, and corresponding message contents are {T1, T2}, {SN}, {SN}, {SN, ONU-ID, T5, T6}, {SN}, {T8}, {SN}, {SN, T3, T4} and {T7}, respectively. In the message contents, "SN" represents the serial number (2 bytes) of the optical network unit 20 sending or receiving the message, "T1", "T3", "T5", "T7" and "T8" represent the start time of an operation corresponding to the message ID, and "T2", "T4" and "T6" represent the duration of the corresponding operation.

Figure 11:
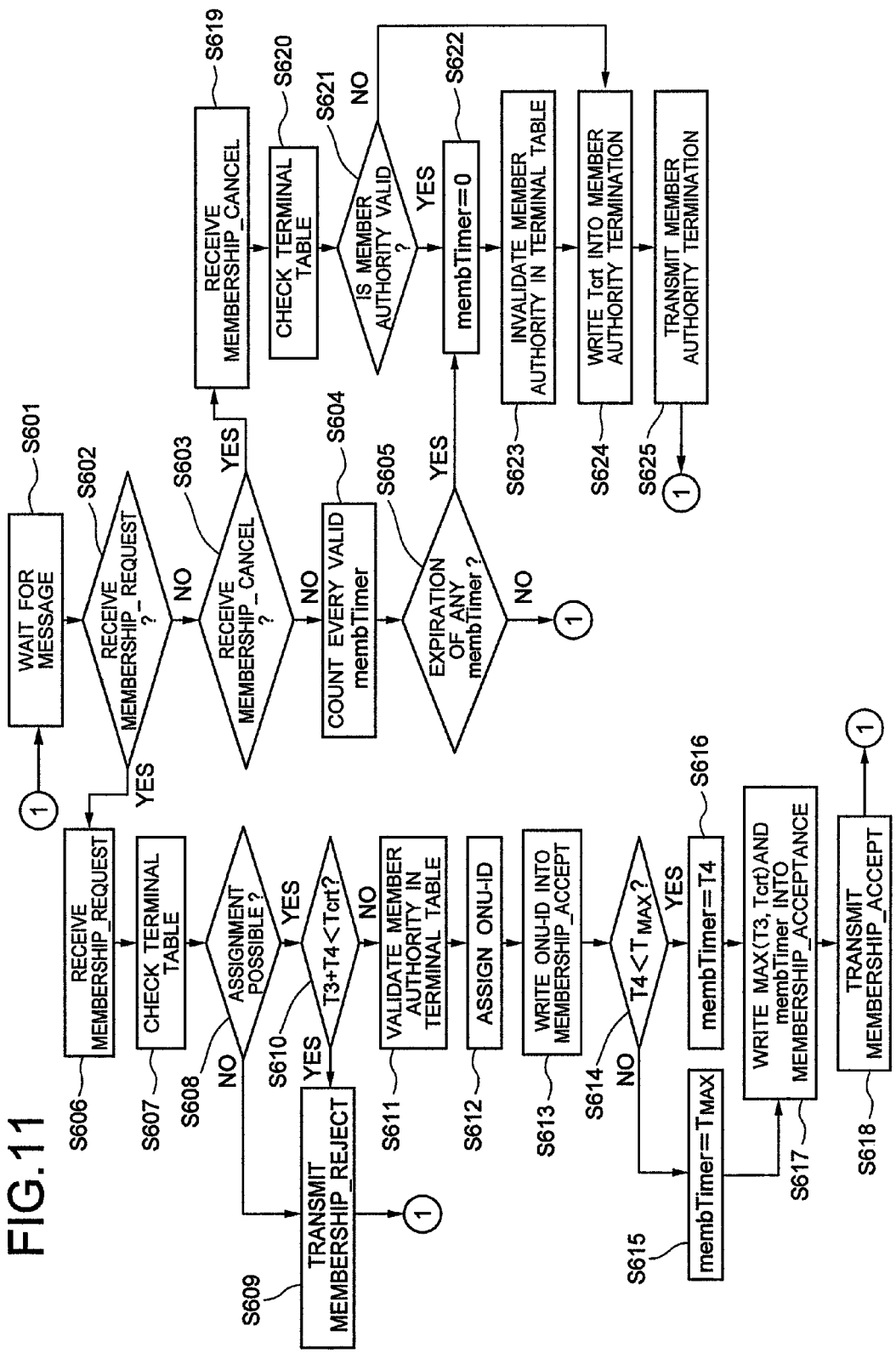
FIG. 11 is a flow chart showing a process executed by the optical line terminal for the membership assignment/termination and message processing/transmission.

FIG. 11 is a flow chart showing a process executed by the optical line terminal 10 for the membership assignment/termination and message processing/transmission. The optical line terminal 10 operating normally and waiting for a message (S601) checks whether a membership request message M21 has been received or not (S602). If "NO" in S602, the optical line terminal 10 checks whether a membership cancellation message M22 has been received or not (S603). If "NO" in S603, the optical line terminal 10 makes every valid membTimer in the terminal table 1041 count (S604). Subsequently, the optical line terminal 10 checks whether there exists a membTimer that has finished counting (COUNT OVER) (S605). If no membTimer has finished counting (S605: NO), the optical line terminal 10 returns to the step S601 and continues the above loop.

Figure 15:
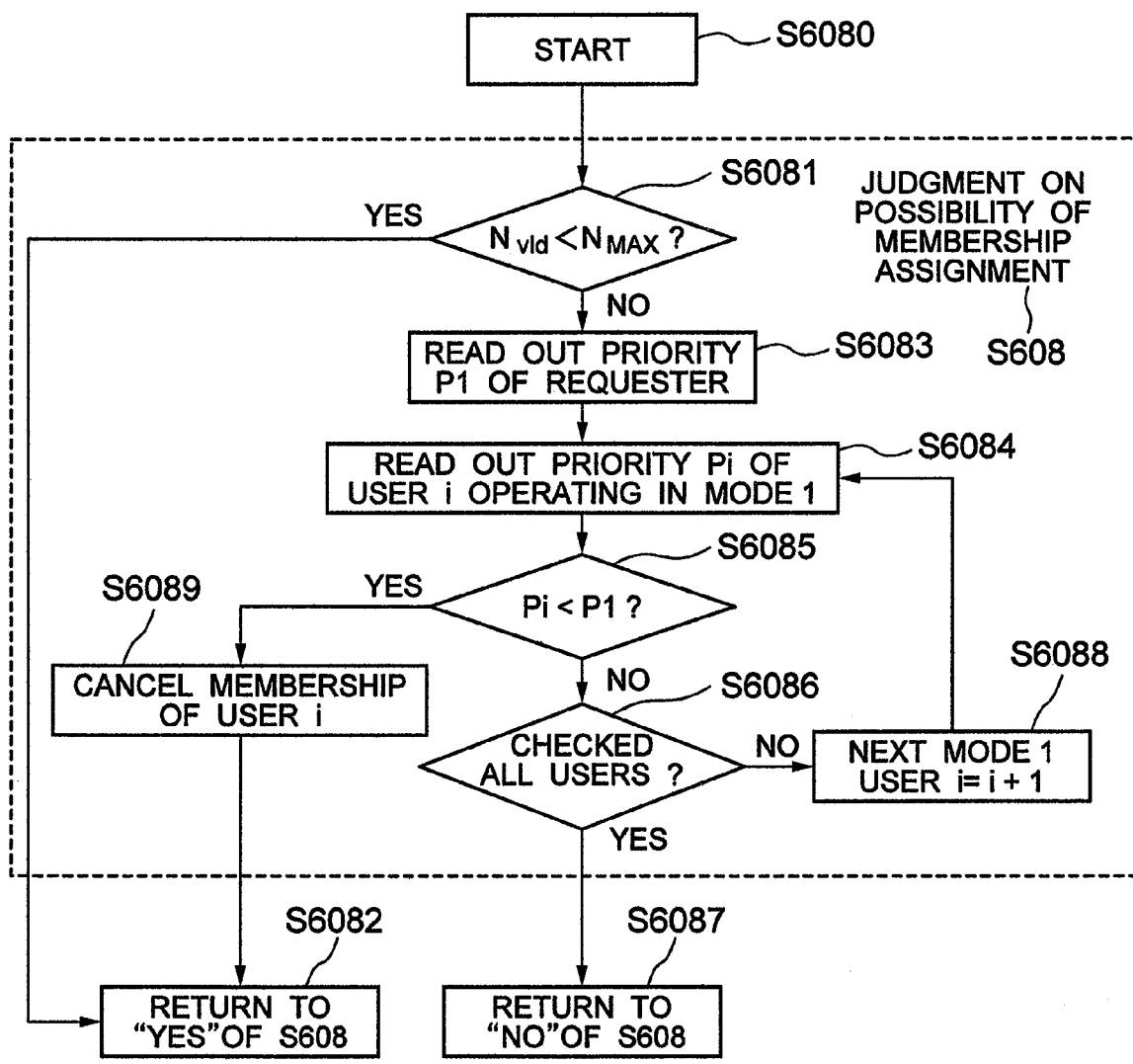
FIG. 15 is a flow chart showing a procedure executed by the optical line terminal for judging the possibility of membership assignment.

If "YES" in S602, that is, if a membership request message M21 has been received (S606), the optical line terminal 10 checks its terminal table 1041 (S607) and judges whether the assignment of membership is possible or not (S608) (see a detailed flow chart of FIG. 15). If "NO" in S608, the optical line terminal 10 writes a corresponding serial number (SN) into a membership rejection message M12 and transmits the message M12 to the requesting optical network unit 20 (S609). On the other hand, if "YES" in S608, the optical line terminal 10 checks whether the sum of T3 and T4 in the received membership request message M21 is smaller than the current time Tcrt or not (S610). If "NO" in S610, the optical line terminal 10 transmits a membership rejection message M12 to the requesting optical network unit 20 (S609). If "YES" in S610, the optical line terminal 10 assigns the membership to the requesting optical network unit 20 by setting the corresponding membership (of the requesting optical network unit 20) in the terminal table 1041 to "valid" (S611), assigning an unused ONU-ID to the requesting optical network unit 20 (S612) and storing the ONU-ID in the terminal table 1041 correspondingly. Subsequently, the optical line terminal 10 writes the newly assigned ONU-ID into a membership acceptance message M11 (S613) and determines the validity time of the assigned membership by checking whether T4 is smaller than the preset maximum time Tmax or not (S614). Specifically, if "NO" in S614, the optical line terminal 10 sets the membTimer in the terminal table 1041 at Tmax (S615). If "YES" in S614, the optical line terminal 10 sets the membTimer in the terminal table 1041 at T4 (S616). After setting the membTimer, the optical line terminal 10 writes the later one of T3 and Tcrt into the membership acceptance message M11 as the start time T5 while writing the membTimer (which has been set in S615 or S616) into the message M11 as the duration T6 (S617). Subsequently, the optical line terminal 10 transmits the membership acceptance message M11 generated in S613-S617 (S618) and thereafter returns to the step S601.

If "YES" in S603, that is, if a membership cancellation message M22 has been received (S619), the optical line terminal 10 checks its terminal table 1041 (S620) and judges whether the membership of the optical network unit 20 transmitting the message M22 is valid or not (S621). If "YES" in S621 or S605, it means that the membership of a corresponding optical network unit 20 should be terminated. In this case, the optical line terminal 10 sets a corresponding membTimer in the terminal table 1041 to 0 (S622) and sets corresponding membership in the terminal table 1041 to "invalid" (S623). Subsequently, the optical line terminal 10 writes the current time Tcrt into a membership termination message M13 (S624), transmits the membership termination message M13 (S625), and thereafter returns to the step S601.

FIG. 15 is a flow chart showing a procedure (S608 in FIG. 11) executed by the optical line terminal 10 for the judgment on the possibility of membership assignment. As explained referring to FIG. 11, the optical line terminal 10 receiving the membership request message M21 judges whether the membership assignment is possible or not (S608) by checking the terminal table 1041. At the start (S6080) of the procedure, the optical line terminal 10 judges whether or not the number (Ncrt) of optical network units 20 currently having valid membership is smaller than the preset maximum number (Nmax) of members (S6081). If "YES" in S6081, the optical line terminal 10 returns to "YES" of S608 in FIG. 11 (S6082) and thereafter continues the process of FIG. 11. If "NO" in S6081, the optical line terminal 10 reads out priority P1 of the requesting optical network unit 20 from the terminal table 1041 (S6083) (see detailed contents of a table of FIG. 16), reads out the priority Pi of each user i (optical network unit 20) operating in mode1 successively (one at a time) from the top of the table (S6084), and judges whether or not the priority Pi read out is lower than P1 (S6085). If "NO" in S6085, it means that the priority P1 of the requester is lower than the user priority Pi currently read out from the table. In this case, the optical line terminal 10 judges whether or not the check has been made for all the users (optical network units 20) operating in mode1 in the terminal table 1041 (S6086). If "YES" in S6086, the optical line terminal 10 returns to "NO" of S608 in FIG. 11 (S6087) and thereafter continues the process of FIG. 11. If "NO" in S6086, the optical line terminal 10 selects the next user (optical network unit 20) from the terminal table 1041 (S6088), returns to the step S6084, and executes the loop from S6084 for the next user. The loop is continued until the check has been made for all the users (optical network units 20) operating in mode1. During the loop, when the step S6085 results in "YES", the optical line terminal 10 cancels the current membership of the user i by, for example, setting the corresponding membership in the terminal table 1041 to "invalid" and transmitting the membership termination message M13 to the user i (S6089), returns to "YES" of S608 in FIG. 11 (S6082), and thereafter continues the process of FIG. 11. Incidentally, in cases where no priority parameter is included in the terminal table 1041 of the optical line terminal 10 as in the case of FIG. 14, the optical line terminal 10 may fix the judgment of S6085 at "NO" (assuming that all the users have the same default priority (e.g. "low"), or skip the whole of the above judgment process S6083-S6089 about priority.

Figure 12:
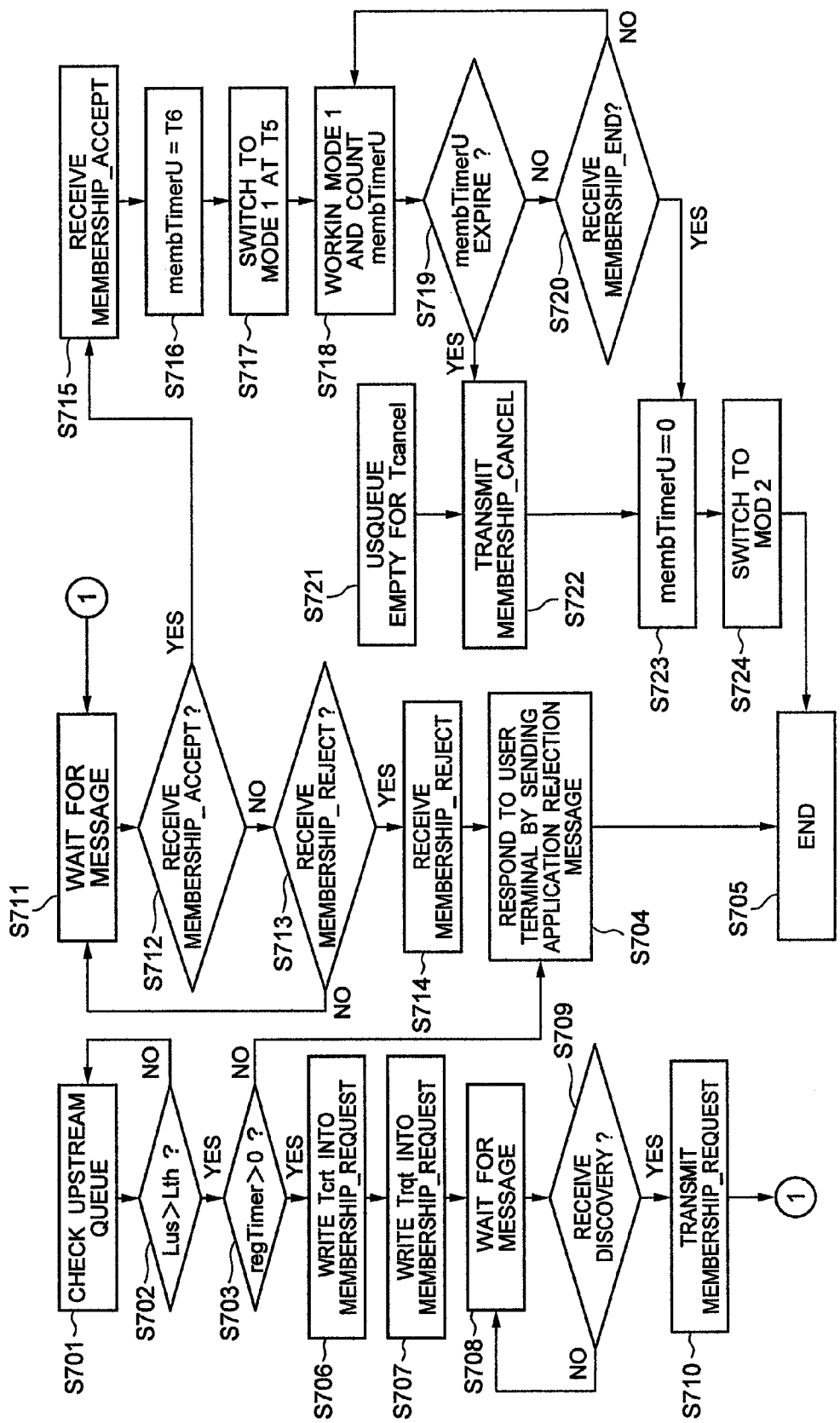
FIG. 12 is a flow chart showing a process executed by the optical network unit for the membership application/cancellation and message processing/transmission.

FIG. 12 is a flow chart showing a process executed by the optical network unit 20 for the membership application/cancellation and message processing/transmission. The optical network unit 20 operating in mode2 checks the upstream queue 2031 (S701) and judges whether the length (LUS) of the upstream queue 2031 has exceeded a preset threshold length Lth or not (S702). If "NO" in S702, the optical network unit 20 returns to S701. If "YES" in S702, it means that the user is making an upstream application. In this case, the optical network unit 20 checks whether the value of the regTimer 2041 is larger than 0 or not (S703). If "NO" in S703, it means that the connection has been lost. In this case, the optical network unit 20 responds to the user side (user terminal) (S704) by sending an application rejection message which indicates that the upstream application has been rejected and the procedure has been ended (S705). The definition of the application rejection message is determined by the user network interface. For example, when the user network interface is a Fast Ethernet interface, the application rejection message is defined in the payload of the Ethernet frame. If "YES" in S703, the optical network unit 20 prepares the membership request message M21 while setting the start time T3 at the current time Tcrt (S706) and the duration T4 at request duration Trqt (S707). The request duration Trqt is preset duration or duration calculated based on the length LUS of the upstream queue 2031 (e.g. time necessary for the transmission of data whose size is 10×LUS). After preparing the membership request message M21, the optical network unit 20 waits for reception of a message (S708) and checks whether a discovery message has been received or not (S709). If "YES" in S709, the optical network unit 20 transmits the membership request message M21 generated in S706 and S707 (S710) and waits for a response message from the optical line terminal 10 (S711).

The optical network unit 20 waiting for a message checks whether a membership acceptance message M11 has been received or not (S712). If "NO" in S712, the optical network unit 20 checks whether a membership rejection message M12 has been received or not (S713). If "NO" in S713, the optical network unit 20 returns to S711 and continues the above loop. If "YES" in S713, that is, if a membership rejection message M12 has been received (S714), the optical network unit 20 responds to the user side (user terminal) (S704) by sending the application rejection message indicating that the upstream application has been rejected and the procedure has been ended (S705).

If "YES" in S712, that is, if a membership acceptance message M11 has been received (S715), the optical network unit 20 sets the membTimerU 2042 at the duration T6 specified in the received message M11 (S716) and switches its operation mode to mode1 at the start time T5 (S717). Subsequently, the optical network unit 20 operating in mode1 makes the membTimerU 2042 start counting (S718) and thereafter checks whether the membTimerU 2042 has finished counting (COUNT OVER) or not (S719). If "NO" in S719, the optical network unit 20 checks whether a membership termination message M13 has been received or not (S720). If "NO" in S720, the optical network unit 20 returns to S718 and continues the loop. When S719 results in "YES" or when the optical network unit 20 finds that a preset time period Tcancel has been set (as an idle time) in the upstream queue 2031 (S721), the optical network unit 20 transmits the membership cancellation message M22 while setting its start time T7 at Tcrt (S722). After transmitting the membership cancellation message M22 (S722) or when S720 results in "YES", the optical network unit 20 sets the membTimerU 2042 to 0 to let it indicate that the membership has been invalidated (S723), switches its operation mode to mode2 (S724), and ends the procedure (S705).

Figure 13:
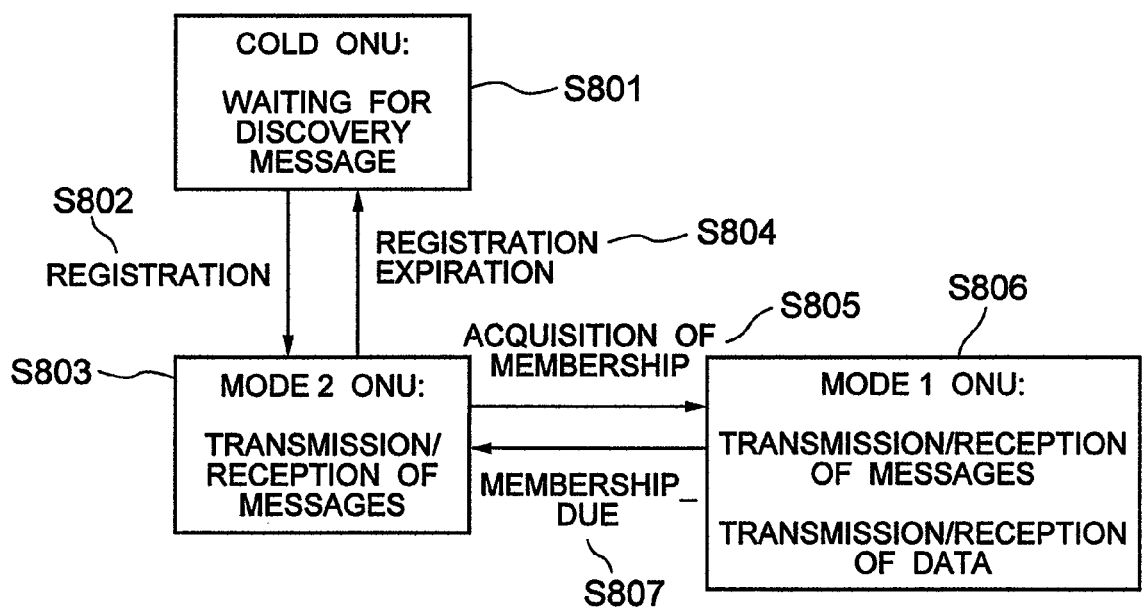
FIG. 13 is a schematic diagram showing different operation modes (states) of the optical network unit in accordance with the first embodiment of the present invention.

FIG. 13 is a schematic diagram showing different operation modes (states) of the optical network unit 20 in accordance with the first embodiment of the present invention. When the optical network unit 20 has not been registered or when the connection with the optical line terminal 10 has been lost, the optical network unit 20 remains in a state "cold optical network unit" (S801) waiting for the next discovery message and staying on standby for the transmission of the registration request message in the next discovery window. After the registration with the optical line terminal 10 (S802) (see the detailed process of FIG. 5), the optical network unit 20 switches to a "mode2 optical network unit" (S803) capable of transmitting/receiving messages to/from the optical line terminal 10 while also being capable of returning to the "cold optical network unit" when the registration expires (S804) (see the detailed process of FIG. 6). As shown in FIG. 7, the "mode2 optical network unit" is capable of switching to a "mode1 optical network unit" (S806) by acquiring the membership from the optical line terminal 10 (S805). The "mode1 optical network unit" switches to the "mode2 optical network unit" when it loses its membership (S807). The "mode1 optical network unit" is capable of transmitting/receiving messages and data to/from the optical line terminal 10 (S806).

FIG. 14 is a table showing an example of the terminal table 1041 of the optical line terminal 10. In the table, the "TERMINAL SN" represents a serial number (SN) of each connected optical network unit 20 (0x00-00-00-00-0xff-ff-ff-ff), "actTimer" represents an activation validity time of the optical network unit 20 corresponding to the terminal SN (0-2 sec), "MEMBERSHIP" represents the validity of the membership of the corresponding optical network unit 20 (valid, invalid), "ONU-ID" represents an ID of an optical network unit 20 operating in mode1 (0x0-0xfd) or in mode2 (0xfe), and "membTimer" represents the validity time of the membership of the corresponding optical network unit 20 (0-600 sec). According to the ITU-T Recommendation G.984.3, an ONU-ID "0xff" is reserved for broadcast data and messages.

FIG. 16 is a table showing another example of the terminal table 1041 of the optical line terminal 10, wherein the meanings of "TERMINAL SN", "actTimer", "MEMBERSHIP", "ONU-ID" and "membTimer" are identical with those in FIG. 14. The "PRIORITY" represents the priority level of the corresponding optical network unit 20. The priority is used by the optical line terminal 10 for discriminating between users in the judgment on the possibility of the membership assignment to an optical network unit 20. The priority can be set to "HIGH", "MIDDLE" or "LOW" as shown in FIG. 16, or to a number between 0 (lowest priority) and 7 (highest priority), for example.

Embodiment 2

Figure 17:
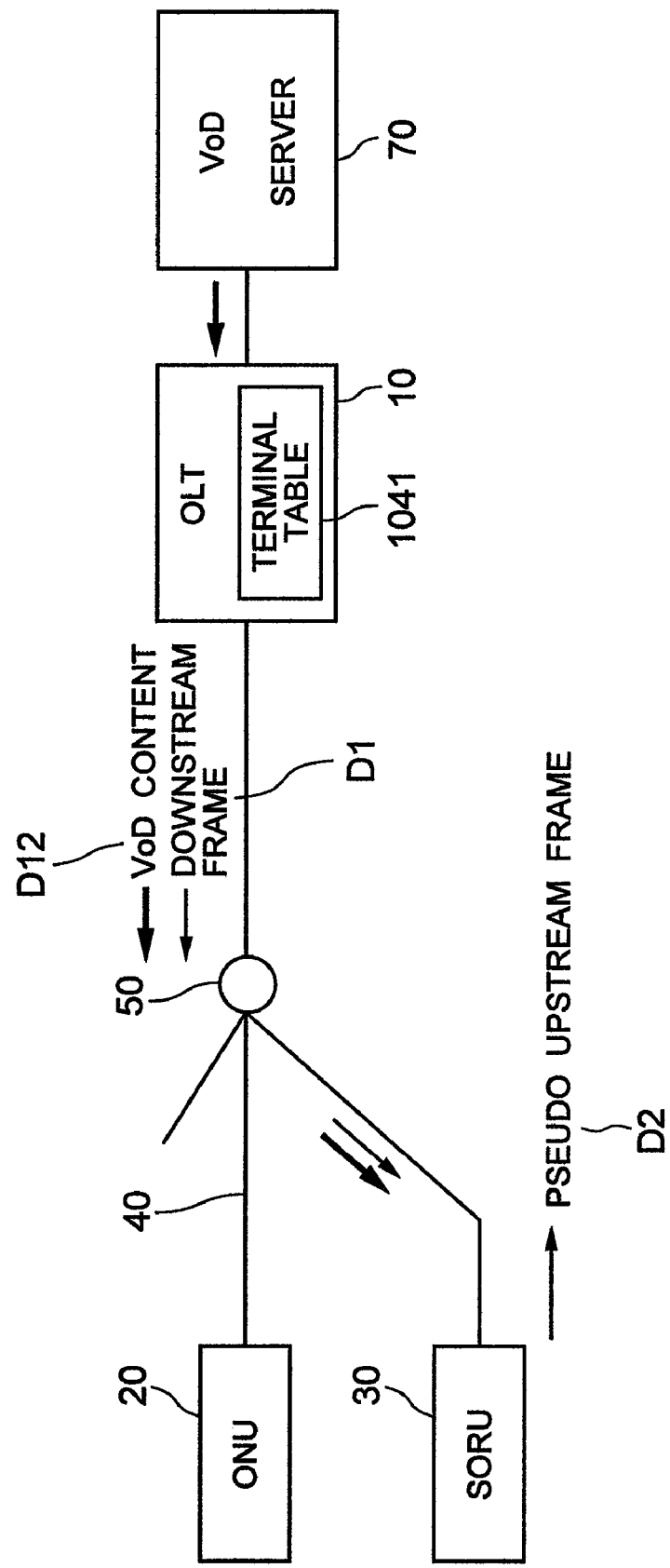
FIG. 17 is a schematic diagram showing an application of a passive optical network, including an optical receiver unit in accordance with a second embodiment of the present invention, to VoD (Video on Demand) service.

FIG. 17 is a schematic diagram showing an application of a passive optical network, including an optical receiver unit in accordance with a second embodiment of the present invention, to VoD (Video on Demand) service. The passive optical network system shown in FIG. 17 includes an optical line terminal 10 having a terminal table 1041, optical network units 20 operating constantly in mode1, optical receiver units 30 capable of operating in either mode1 or mode2, and optical fiber links 40 and an optical splitter 50 connecting the optical line terminal 10 with the optical network units 20 and the optical receiver units 30 by the tree topology. The optical receiver unit 30 is capable of changing its membership like the optical network units 20 in the first embodiment shown in FIG. 2. The optical receiver unit 30 operates in mode1 when its membership is valid, while operating in mode2 when its membership is invalid (see detailed states shown in FIG. 20).

In the following description of the second embodiment, descriptions related to the composition of the optical line terminal 10, the optical network unit 20 and the optical receiver unit 30, a sequence by the optical line terminal 10 for maintaining/terminating connection with the optical receiver unit 30 operating in mode2, alteration of the membership of the optical receiver unit 30, flow charts of the optical line terminal 10 and the optical receiver unit 30, and definitions of messages between the optical line terminal 10 and the optical receiver unit 30 are omitted for the sake of simplicity since they are similar to those in the first embodiment.

Figure 18:
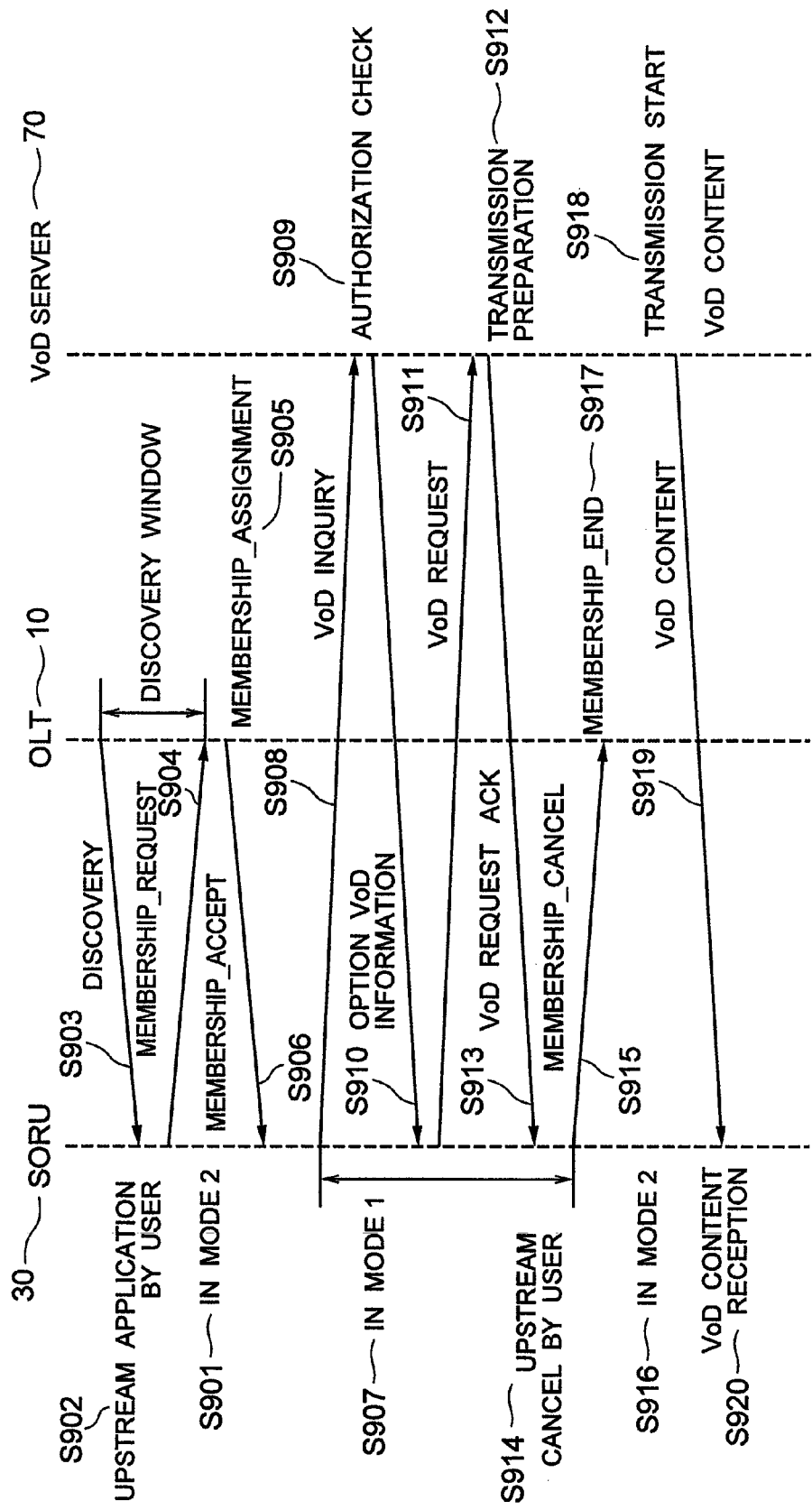
FIG. 18 is a time sequence diagram showing a case where the optical receiver unit in accordance with the second embodiment receives the VoD service by communicating with an optical line terminal and a VoD server.

FIG. 18 is a time sequence diagram showing a case where the optical receiver unit 30 in accordance with the second embodiment receives the VoD service by communicating with the optical line terminal 10 and a VoD server 70. As shown in FIG. 18, the optical receiver unit 30 operates in mode2 when its membership is invalid (S901). When the optical receiver unit 30 finds that a user is making an upstream application (by checking whether there exists a VoD inquiry in the upstream queue 2031, for example) (S902), the optical receiver unit 30 makes response to a subsequently received discovery message (S903) by transmitting the membership request message M21 (S904). Upon reception of the membership request message M21, the optical line terminal 10 assigns the membership (S905) and transmits the membership acceptance message M11 to the optical receiver unit 30 (S906). The optical receiver unit 30 receiving the membership acceptance message M11 starts operating in mode1 from the time assigned by the optical line terminal 10 (S907). During the mode1 operation, the optical receiver unit 30 is capable of transmitting upstream data (see detailed states shown in FIG. 20). Thus, the optical receiver unit 30 sends the VoD inquiry to the VoD server 70 via the optical line terminal 10 (S908). The VoD server 70 receiving the VoD inquiry from the optical receiver unit 30 checks the authority of the received inquiry (S909). If the requesting optical receiver unit 30 has valid authority, the VoD server 70 makes response to the inquiry by transmitting option VoD information to the requesting optical receiver unit 30 (S910). The optical receiver unit 30 transmits a VoD request to the VoD server 70 (S911) after customization by the user, or ends the process with no customization. Upon reception of the VoD request, the VoD server 70 analyzes the request, prepares for the transmission of VoD content according to the request (S912), and responds to the request by transmitting a VoD request confirmation message (S913). Thereafter, when the optical receiver unit 30 finds upstream cancellation by the user (by checking the upstream queue 2031 and detecting that a preset idle time is being maintained, for example) (S914), the optical receiver unit 30 cancels its membership by transmitting the membership cancellation message M22 (S915) and starts operating in mode2 (S916). Upon reception of the membership cancellation message M22, the optical line terminal 10 terminates the membership of the optical receiver unit 30 by updating the terminal table 1041 (S917). At the same time, the VoD server 70 starts the transmission of the VoD content according to the request received in S911 (S918), by which necessary VoD content is supplied to the optical receiver unit 30 (S919). The optical receiver unit 30 operating in mode2 (S916) continues receiving the VoD content (S920) without transmitting any upstream data. Incidentally, since an ONU-ID "0xfe" is used for all optical receiver units 30 operating in mode2 (see detailed description of ONU-IDs in FIG. 19), the VoD content has to be packaged together with the serial number (SN) of the requesting optical receiver unit 30 by the optical line terminal 10, and filtering has to be executed by the optical receiver unit 30 by checking the ONU-ID and the serial number (SN).

FIG. 19 is a table showing an example of the terminal table 1041 of the optical line terminal 10 in accordance with the second embodiment of the present invention, wherein the meanings of "TERMINAL SN", "actTimer", "MEMBERSHIP" and "membTimer" are identical with those in FIG. 14. Since there are optical network units 20 operating constantly in mode1 and optical receiver units 30 capable of operating in either mode1 or mode2, the type of each connected terminal is represented by the "TERMINAL TYPE" ("ONU" or "SORU") in the first column of the terminal table. The "ONU-ID" represents an ID of an optical network unit 20 or an optical receiver unit 30. An ONU-ID between "0x0" and "0xfd" represents an optical network unit 20 (operating constantly in mode1) or an optical receiver unit 30 operating in mode1. An ONU-ID "0xfe" represents an optical receiver unit 30 operating in mode2. An ONU-ID "0xff" represents broadcast data and messages according to the ITU-T Recommendation G.984.3.

Figure 20:
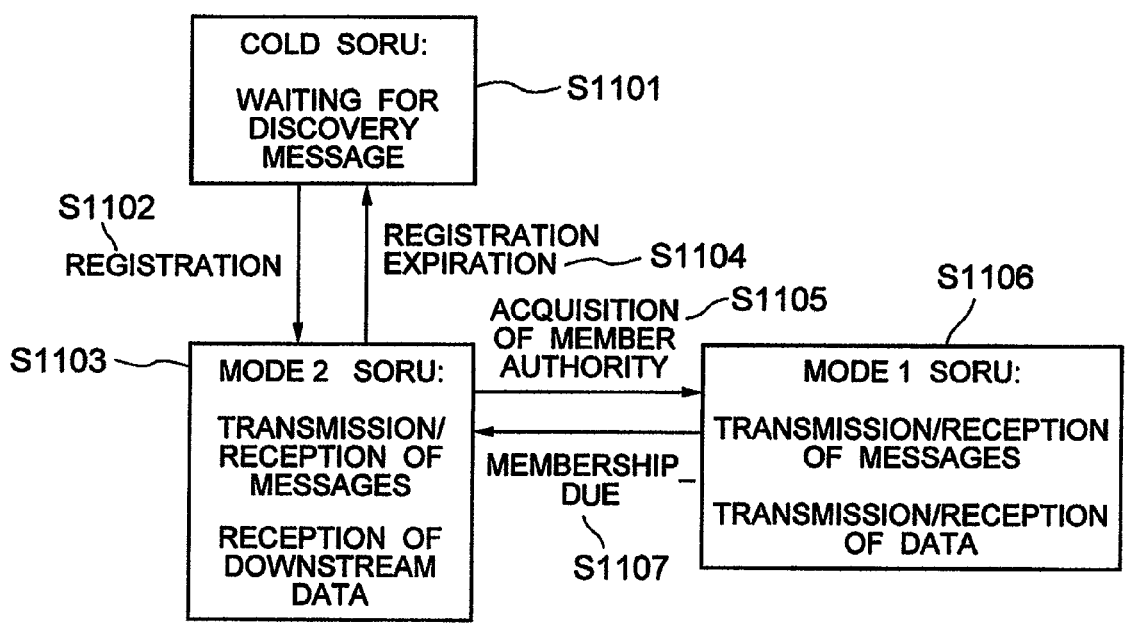
FIG. 20 is a schematic diagram showing different operation modes (states) of the optical receiver unit in accordance with the second embodiment of the present invention.

FIG. 20 is a schematic diagram showing different operation modes (states) of the optical receiver unit 30 in accordance with the second embodiment of the present invention. When the optical receiver unit 30 has not been registered or when the connection with the optical line terminal 10 has been lost, the optical receiver unit 30 remains in a state "cold optical receiver unit" (S1101) waiting for the next discovery message and staying on standby for the transmission of the registration request message in the next discovery window. After the registration with the optical line terminal 10 (S1102), the optical receiver unit 30 switches to a "mode2 optical receiver unit" (S1103) capable of transmitting/receiving messages to/from the optical line terminal 10 and returning to the "cold optical receiver unit" when the registration expires (S1104). The "mode2 optical receiver unit" is capable of switching to a "mode1 optical receiver unit" (S1106) by acquiring the membership from the optical line terminal 10 (S1105). The "mode1 optical receiver unit" switches to the "mode2 optical receiver unit" when it loses its membership (S1107). The "mode1 optical receiver unit" is capable of transmitting/receiving messages and data to/from the optical line terminal 10 (S1106).

Embodiment 3

In the following description of a third embodiment of the present invention, descriptions related to a sequence by the optical line terminal 10 for maintaining/terminating connection with the optical receiver unit 30 operating in mode2, alteration of the membership of the optical receiver unit 30, flow charts of the optical line terminal 10 and the optical receiver unit 30, definitions of messages between the optical line terminal 10 and the optical receiver unit 30, the terminal table 1041 of the optical line terminal 10, and the operation modes (states) of the optical receiver unit 30 are omitted since they are similar to those described in the first embodiment.

Figure 21:
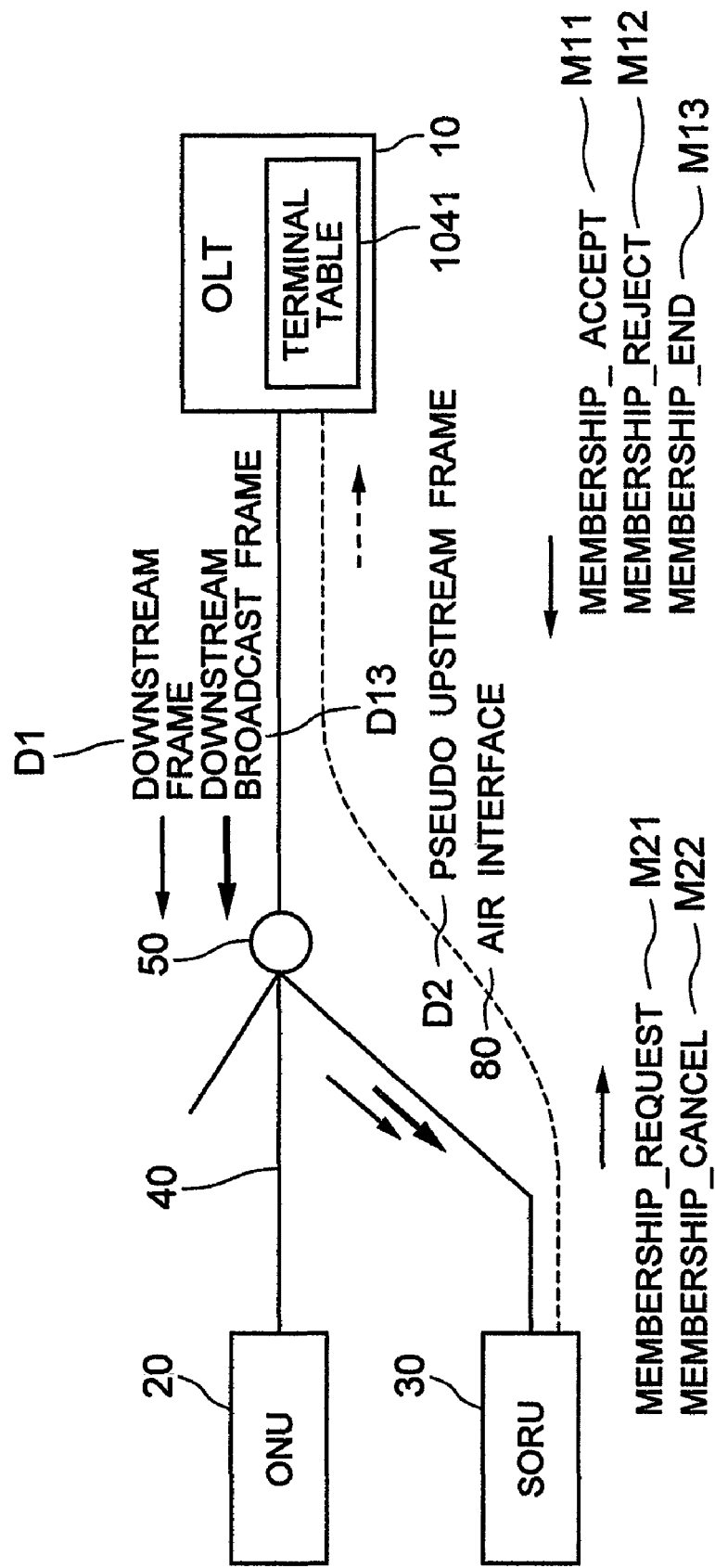
FIG. 21 is a schematic diagram showing a passive optical network system including an optical receiver unit (equipped with a wireless uplink interface) in accordance with a third embodiment of the present invention and message exchange between the optical receiver unit and an optical line terminal when the operation mode of the optical receiver unit is changed.

FIG. 21 is a schematic diagram showing a passive optical network system including an optical receiver unit 30 (equipped with a wireless uplink interface) in accordance with the third embodiment and message exchange between the optical receiver unit 30 and an optical line terminal 10 when the operation mode of the optical receiver unit 30 is changed. The passive optical network system shown in FIG. 21 includes an optical line terminal 10 having a terminal table 1041, optical network units 20 operating constantly in mode1, optical receiver units 30 capable of operating in either mode1 or mode2, optical fiber links 40 and an optical splitter 50 connecting the optical line terminal 10 with the optical network units 20 and the optical receiver units 30 by the tree topology, and an air interface 80 connecting the optical line terminal 10 with the optical receiver units 30 in the star topology. The optical receiver unit 30 is capable of changing its membership like the optical network units 20 in the first embodiment shown in FIG. 2. The optical receiver unit 30 operates in mode1 when its membership is valid, while operating in mode2 when its membership is invalid. For the optical network unit 20, all upstream/downstream messages/data are carried by the optical fiber link 40 and the optical splitter 50. Meanwhile, for the optical receiver unit 30, upstream messages/data (membership request message M21, membership cancellation message M22, pseudo upstream frame D2, etc.) are carried by the air interface 80, whereas downstream messages/data (membership acceptance message M11, membership rejection message M12, membership termination message M13, downstream frame D1, downstream broadcast frame D13, etc.) are carried by the optical fiber link 40 and the optical splitter 50. Since the upstream messages/data from each optical receiver unit 30 are carried by a link different from those for optical network units 20, the optical line terminal 10 does not have to take the optical network units 20 into consideration in the membership assignment to an optical receiver unit 30 or in upstream bandwidth grant to an optical receiver unit 30 operating in mode1.

Figure 22:
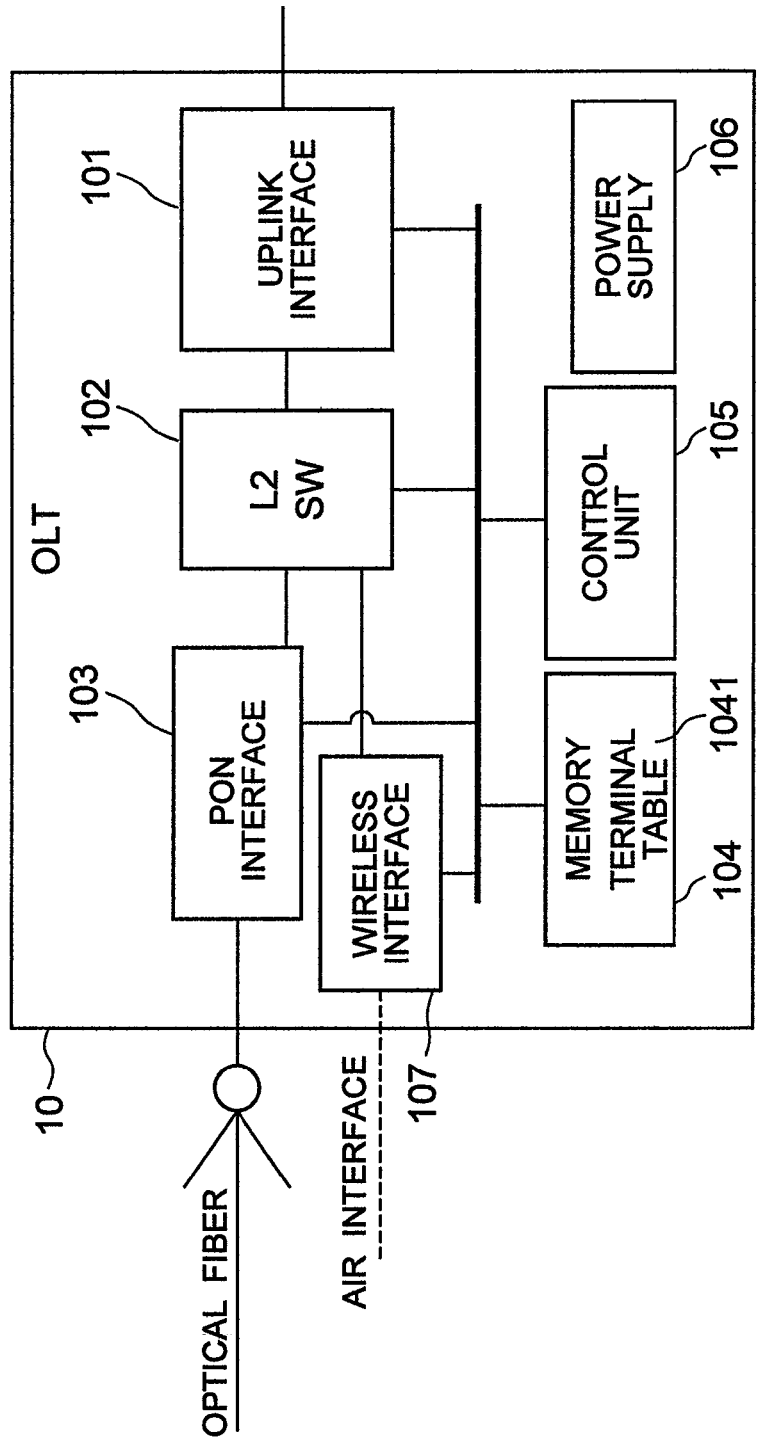
FIG. 22 is a block diagram of the optical line terminal (equipped with an air interface) in accordance with the third embodiment of the present invention.

FIG. 22 is a block diagram of the optical line terminal 10 (equipped with an air interface) in accordance with the third embodiment of the present invention. The optical line terminal 10 includes an uplink interface 101 for the communication with the service side (service terminal), a layer 2 switch (L2SW) 102 for the exchange of upstream/downstream data, a PON interface 103 connected to the optical fiber links 40 to execute upstream/downstream communication with the optical network units 20 while executing downstream communication with the optical receiver units 30, a memory unit 104 including the terminal table 1041 for storing the membership parameters of the optical network units 20 and the optical receiver units 30, a control unit 105 for controlling the operation of the other units/modules of the optical line terminal 10 (transmission of the membership acceptance message M11, update of the terminal table 1041, etc.), a power supply 106 for supplying electric power to the units/modules, and a wireless interface 107 connecting with the air interface 80 and executing the upstream communication with the optical receiver units 30.

Figure 23:
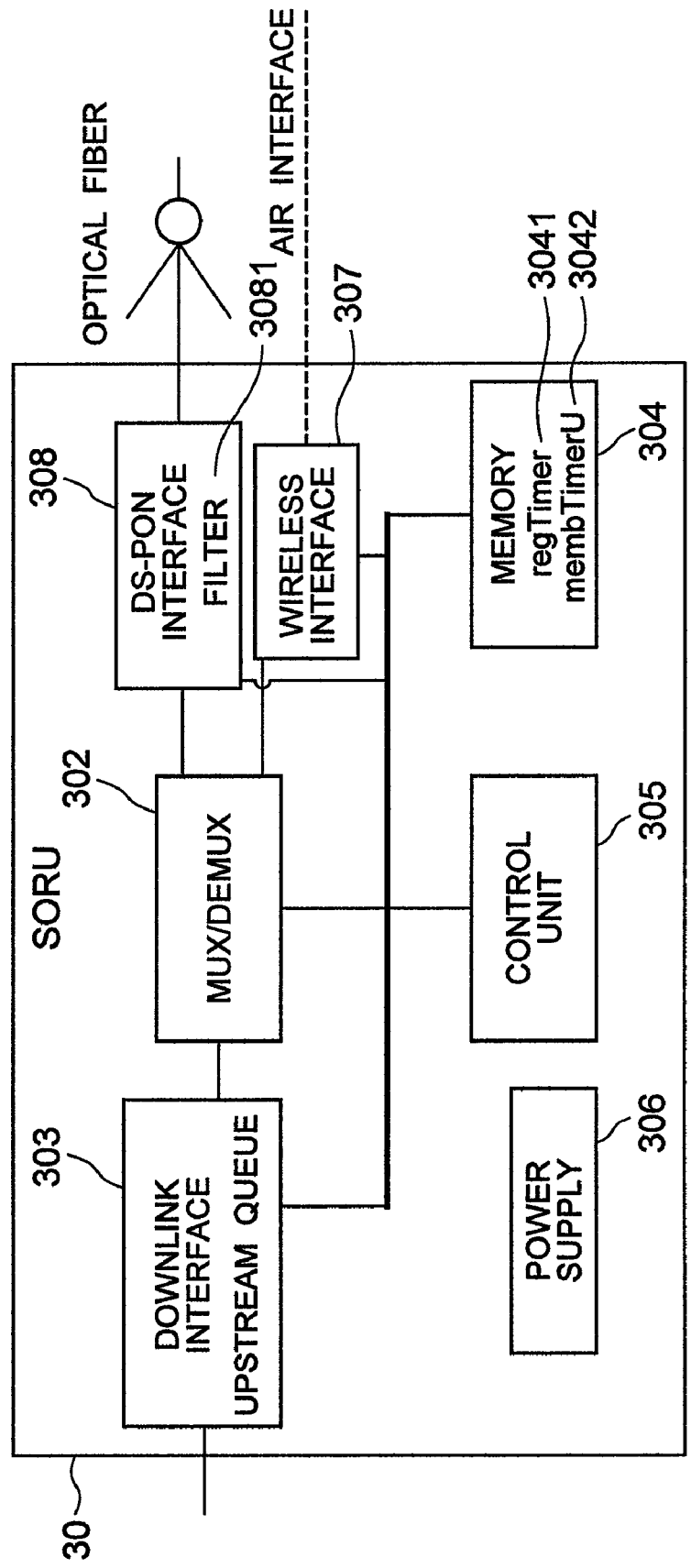
FIG. 23 is a block diagram of the optical receiver unit (equipped with an air interface) in accordance with the third embodiment of the present invention.

FIG. 23 is a block diagram of the optical receiver unit 30 (equipped with an air interface) in accordance with the third embodiment of the present invention. The optical receiver unit 30 includes a multiplexer/demultiplexer unit 302 for multiplexing/demultiplexing the upstream/downstream data, a downlink interface 303 including an upstream queue 3031 (as the buffer for the upstream data) and communicating with the user side (user terminal), a memory unit 304 including a regTimer 3041 for distinguishing whether the activation of the optical receiver unit 30 is valid or not and a membTimerU 3042 for distinguishing whether the membership of the optical receiver unit 30 is valid or not, a control unit 305 for controlling the operation of the other units/modules of the optical receiver unit 30 (transmission of the membership request message M21, update of the membTimerU 3042, etc.), a power supply 306 for supplying electric power to the units/modules, a wireless interface 307 connecting with the air interface 80 and executing the upstream communication with the optical line terminal 10, and a DS-PON interface 308 connected to the optical fiber link 40, having a filter 3081 for filtering the downstream frames D1 and downstream broadcast frames D13 and executing the downstream communication with the optical line terminal 10.

Embodiment 4

In the following description of a fourth embodiment of the present invention, descriptions related to the composition of the optical line terminal 10, the flow charts of the optical line terminal 10 and the optical receiver unit 30, definitions of messages between the optical line terminal 10 and the optical receiver unit 30 (which are similar to those in the first embodiment), the terminal table 1041 of the optical line terminal 10 and the operation modes (states) of the optical receiver unit 30 (which are similar to those in the second embodiment) are omitted for brevity.

Figure 24:
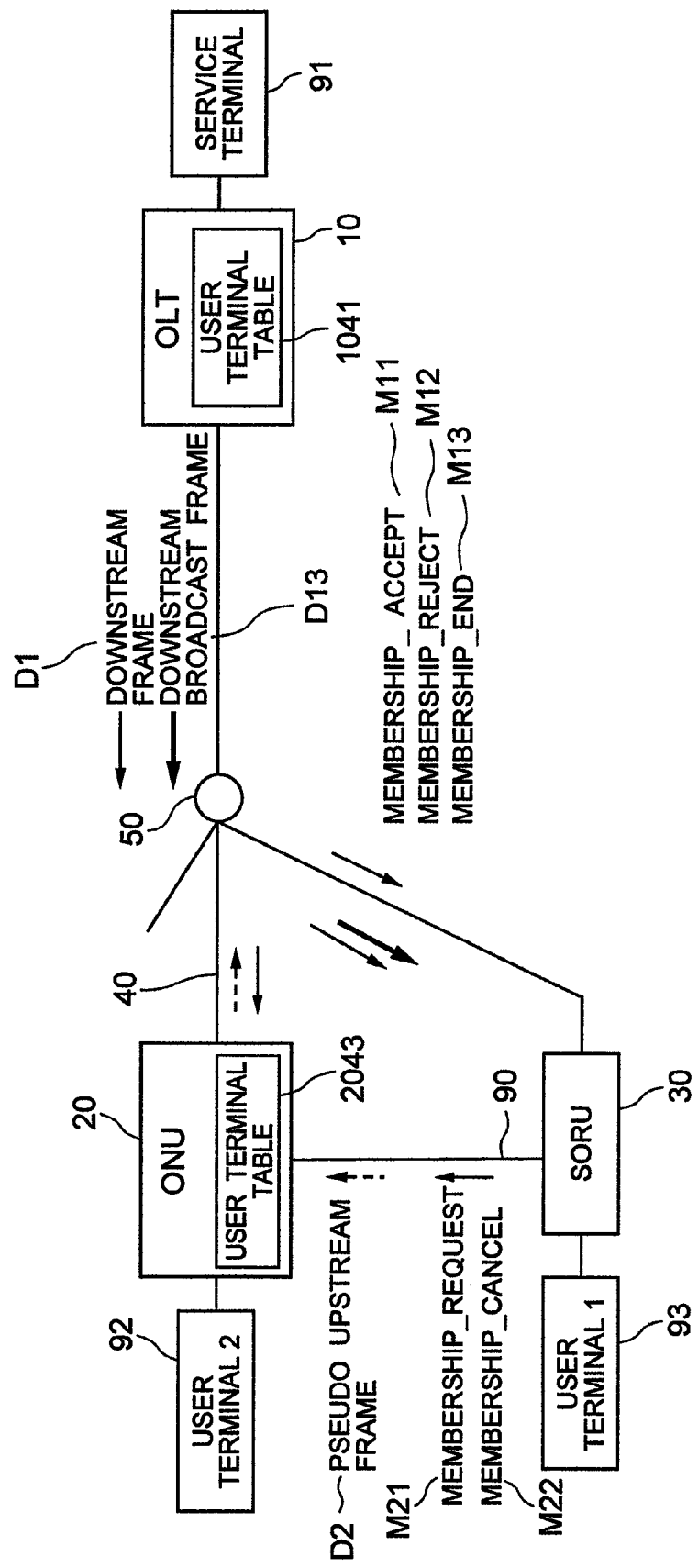
FIG. 24 is a schematic diagram showing a passive optical network system including an optical receiver unit (equipped with a copper line uplink interface) in accordance with a fourth embodiment of the present invention and message exchange between the optical receiver unit and an optical line terminal when the operation mode of the optical receiver unit is changed.

FIG. 24 is a schematic diagram showing a passive optical network system including an optical receiver unit 30 (equipped with a copper line (cable) uplink interface) in accordance with the fourth embodiment and message exchange between the optical receiver unit 30 and an optical line terminal 10 when the operation mode of the optical receiver unit 30 is changed. The passive optical network system shown in FIG. 24 includes an optical line terminal 10 having a terminal table 1041, an optical network unit 20 including a user terminal table 2043 and operating constantly in mode1, an optical receiver unit 30 capable of operating in either mode1 or mode2, optical fiber links 40 and an optical splitter 50 connecting the optical line terminal 10 with the optical network unit 20 and the optical receiver unit 30 by the tree topology, a copper line 90 connecting the optical network unit 20 and the optical receiver unit 30, a service terminal (SNI) 91 connected to the optical line terminal 10 and supplying service to the user side (user terminals), a second user terminal (UNI) 92 connected to the optical network unit 20 and receiving service from the service side (service terminal), and a first user terminal (UNI) 93 connected to the optical receiver unit 30 and receiving service from the service side (service terminal). The optical receiver unit 30 is capable of changing its membership like the optical network units 20 in the first embodiment shown in FIG. 2. The optical receiver unit 30 operates in mode1 when its membership is valid, while operating in mode2 when its membership is invalid. For the optical network unit 20, all upstream/downstream messages/data are carried by the optical fiber link 40 and the optical splitter 50. Meanwhile, for the optical receiver unit 30, upstream messages/data (membership request message M21, membership cancellation message M22, pseudo upstream frame D2, etc.) are carried by a link formed by the copper line 90, the optical network unit 20, the optical fiber link 40 and the optical splitter 50, whereas downstream messages/data (membership acceptance message M11, membership rejection message M12, membership termination message M13, downstream frame D1, downstream broadcast frame D13, etc.) are carried by the optical fiber link 40 and the optical splitter 50.

Figure 25:
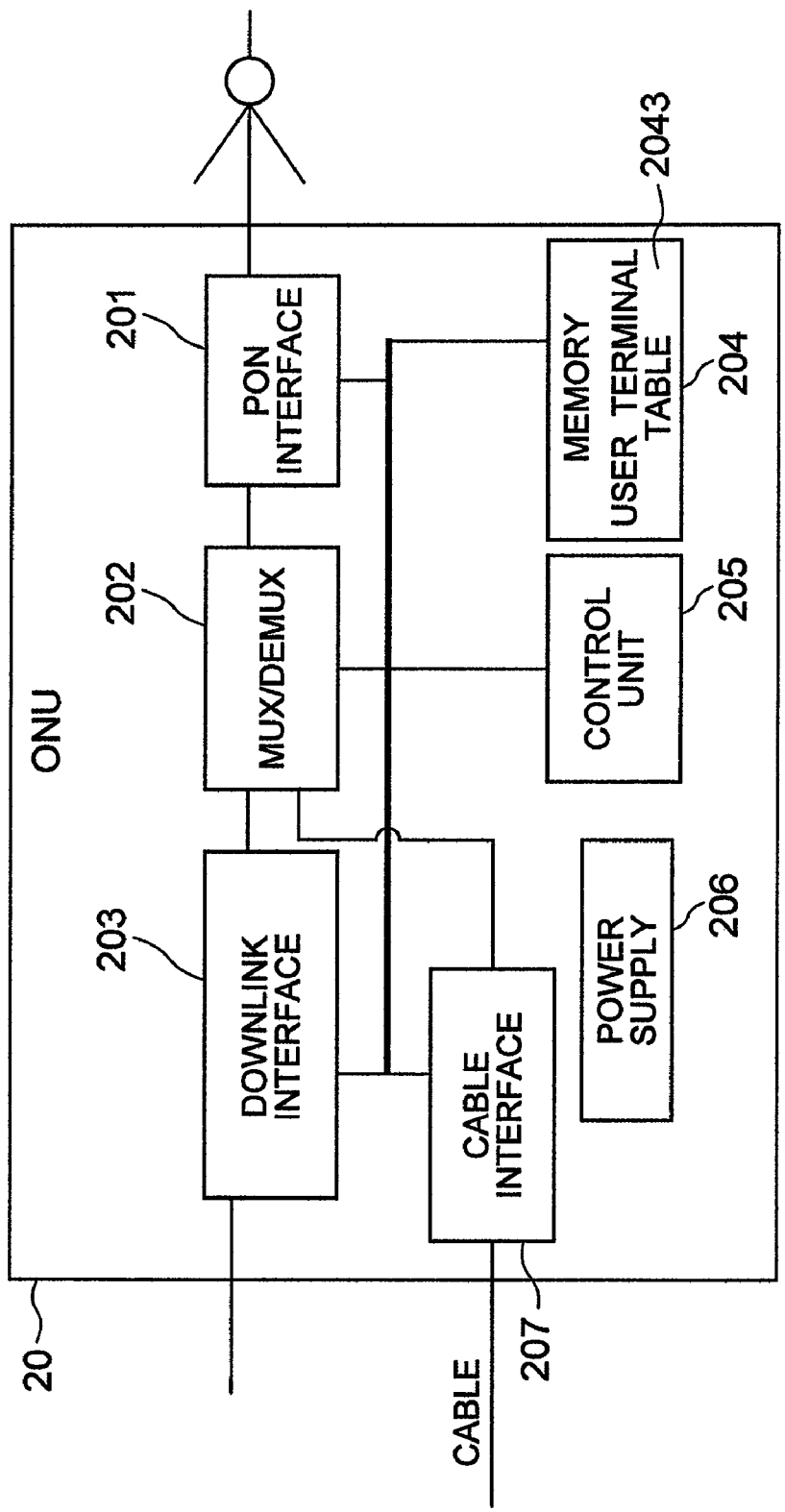
FIG. 25 is a block diagram of an optical network unit (equipped with a copper line interface connected to the optical receiver unit) in accordance with the fourth embodiment of the present invention.

FIG. 25 is a block diagram of the optical network unit 20 (equipped with a copper line interface connected to the optical receiver unit 30) in accordance with the fourth embodiment of the present invention. The optical network unit 20 includes a PON interface 201 connected to the optical fiber link 40 and communicating with the optical line terminal 10 connected to the link 40, a multiplexer/demultiplexer unit 202 for multiplexing/demultiplexing the upstream/downstream data, a downlink interface 203 for communicating with a user terminal connected thereto, a memory unit 204 including the user terminal table 2043 for storing membership parameters of optical receiver units 30, a control unit 205 for controlling the operation of the other units/modules of the optical network unit 20 (e.g. update of the user terminal table 2043), a power supply 206 for supplying electric power to the units/modules, and a copper line (cable) interface 207 connected to the cable 90 and executing the upstream communication with the optical receiver unit 30.

Figure 26:
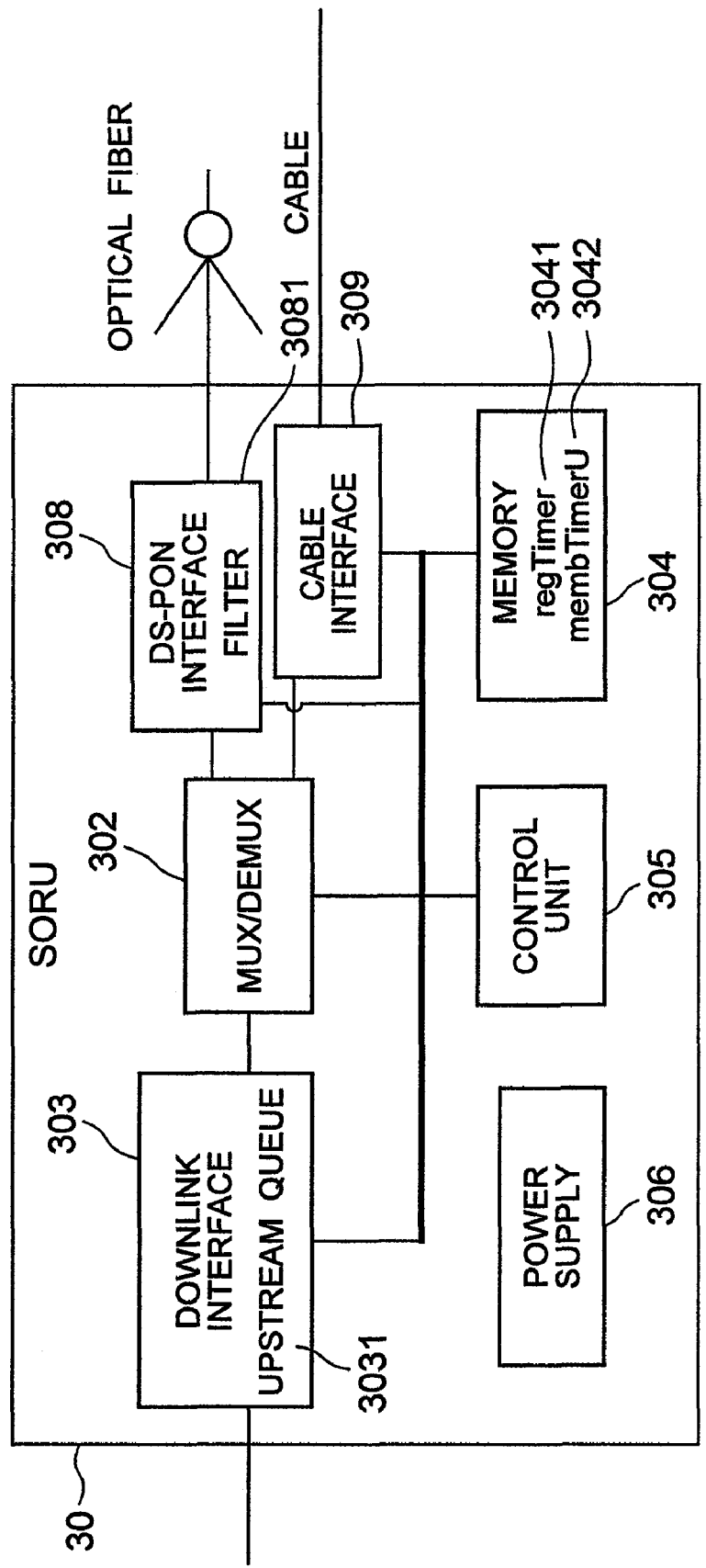
FIG. 26 is a block diagram of the optical receiver unit (equipped with a copper line interface) in accordance with the fourth embodiment of the present invention.

FIG. 26 is a block diagram of the optical receiver unit 30 (equipped with a copper line interface) in accordance with the fourth embodiment of the present invention. The optical receiver unit 30 includes a multiplexer/demultiplexer unit 302 for multiplexing/demultiplexing the upstream/downstream data, a downlink interface 303 having an upstream queue 3031 (as the buffer for the upstream data) and communicating with the user side (user terminal), a memory unit 304 including a regTimer 3041 for distinguishing whether the activation of the optical receiver unit 30 is valid or not and a membTimerU 3042 for distinguishing whether the membership of the optical receiver unit 30 is valid or not, a control unit 305 for controlling the operation of the other units/modules of the optical receiver unit 30 (transmission of the membership request message M21, update of the membTimerU 3042, etc.), a power supply 306 for supplying electric power to the units/modules, a copper line (cable) interface 309 connected to the cable 90 and executing the upstream communication with the optical line terminal 10 via the optical network unit 20, and a DS-PON interface 308 connected to the optical fiber link 40, having a filter 3081 for filtering the downstream frames D1 and downstream broadcast frames D13 and executing the downstream communication with the optical line terminal 10.

Figure 27:
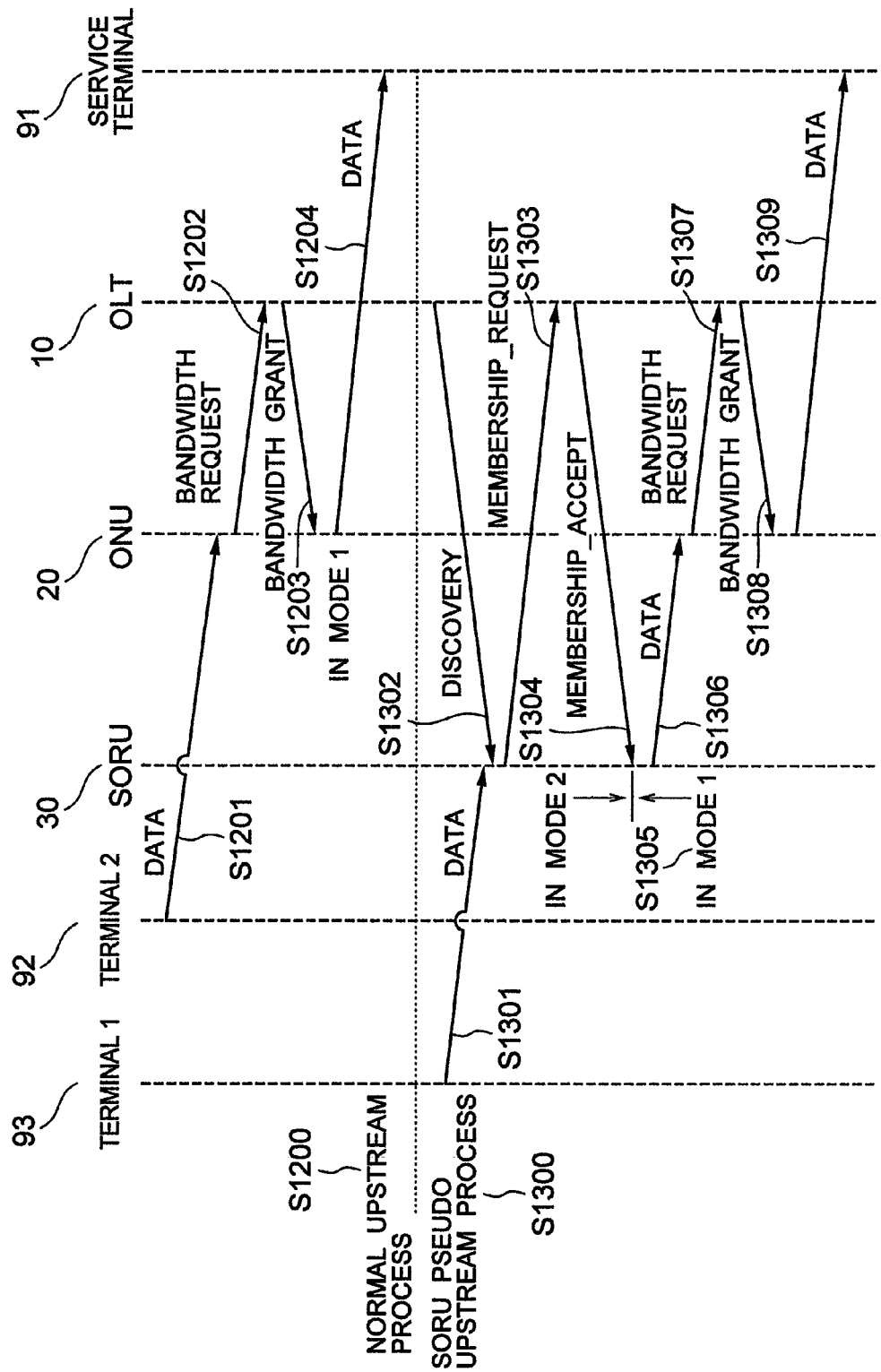
FIG. 27 is a time sequence diagram showing communication executed by the optical network unit with the optical line terminal by a normal upstream process and communication executed by the optical receiver unit with the optical line terminal by a pseudo upstream process in the fourth embodiment.

FIG. 27 is a time sequence diagram showing communication executed by the optical network unit 20 with the optical line terminal 10 by a normal upstream process and communication executed by the optical receiver unit 30 with the optical line terminal 10 by a pseudo upstream process in the fourth embodiment. As shown in FIG. 27, the optical receiver unit 30 operates in mode1 when its membership is valid while operating in mode2 when its membership is invalid, whereas the optical network unit 20 operates constantly in mode1. The step S1200 in FIG. 27 represents the normal upstream process in which the optical network unit 20 communicates with the optical line terminal 10. When the optical network unit 20 finds that the downlink interface 203 has received data from the second user terminal (UNI) 92 (S1201), the optical network unit 20 transmits a bandwidth request message to the optical line terminal 10 (S1202). As a result of upstream bandwidth grant by the optical line terminal 10, a bandwidth grant message is sent back to the optical network unit 20 (S1203) (ITU-T Recommendation G.983.4). Thereafter, data received by the downlink interface 203 of the optical network unit 20 are forwarded therefrom to the optical line terminal 10 (S1204).

The step S1300 in FIG. 27 represents the pseudo upstream process in which the optical receiver unit 30 communicates with the optical line terminal 10 via the optical network unit 20. When the optical receiver unit 30 finds that the downlink interface 303 has received data from the first user terminal (UNI) 93 (S1301) and the length of the upstream queue 3031 has exceeded a preset threshold length Lth, the optical receiver unit 30 waits for reception of the next discovery message transmitted from the optical line terminal 10 via the optical fiber link 40 (S1302). Upon reception of the discovery message, the optical receiver unit 30 transmits the membership request message M21 to the optical line terminal 10 via a link formed by the copper line 90, the optical network unit 20, the optical fiber link 40 and the optical splitter 50 (S1303). The optical line terminal 10 receiving the membership request message M21 sends back the membership acceptance message M11 to the optical receiver unit 30 via the optical fiber link 40 (S1304). The optical receiver unit 30 receiving the membership acceptance message M11 starts operating in mode1 from the time assigned by the optical line terminal 10 (S1305). During the mode1 operation, the optical receiver unit 30 transmits upstream data (S1306) by forwarding them to the optical network unit 20. When data received by the copper line interface 207 from the optical receiver unit 30 is found, the optical network unit 20 transmits the bandwidth request message to the optical line terminal 10 (S1307). The optical line terminal 10 responds to the bandwidth request message by sending back the bandwidth grant message (S1308). Thereafter, data received by the optical network unit 20 from the optical receiver unit 30 are forwarded therefrom to the optical line terminal 10 (S1309).

FIG. 28 is a table showing an example of the user terminal table 2043 of the optical network unit 20 in accordance with the fourth embodiment of the present invention, wherein the meanings of "TERMINAL SN", "actTimer", "MEMBERSHIP" and "ONU-ID" are identical with those in FIG. 14, "regTimer" and "membTimerU" represent those in FIG. 26, and "PORT" represents a port number 30 of the copper line interface 207 connected to the optical receiver unit 30. Since the port "0" represents the optical network unit 20 itself, the port "0" corresponds to the terminal type "ONU" and the other ports correspond to the terminal type "SORU". Incidentally, as long as the optical network unit 20 operates constantly in mode1, the "regTimer" and "membTimerU" corresponding to the port "0" are undefined (N/A).

Embodiment 5

In the following description of a fifth embodiment of the present invention, descriptions related to the composition of the optical line terminal 10 and the optical receiver unit 30, the sequence between the optical line terminal 10 and the optical network unit 20, the sequence between the optical line terminal 10 and the optical receiver unit 30, definitions of messages between the optical line terminal 10 and the optical receiver unit 30, the terminal tables of the optical line terminal 10 and the optical network unit 20, and the operation modes (states) of the optical receiver unit 30 are omitted for brevity since they are similar to those in the fourth embodiment.

Figure 29:
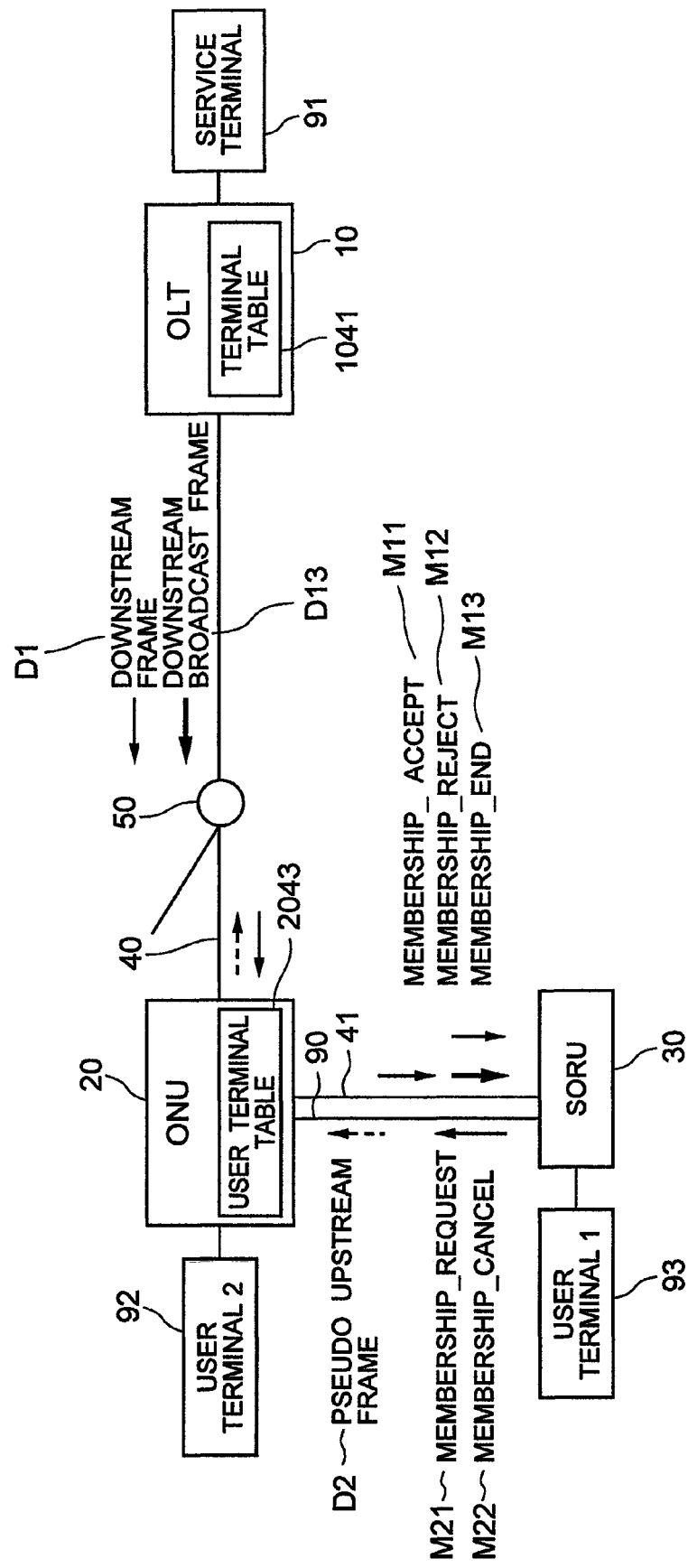
FIG. 29 is a schematic diagram showing a passive optical network system including an optical receiver unit (equipped with a copper line uplink and an optical downlink connected to an optical network unit) in accordance with a fifth embodiment of the present invention.

FIG. 29 is a schematic diagram showing a passive optical network system including an optical receiver unit 30 (equipped with a copper line uplink and an optical downlink connected to an optical network unit) in accordance with the fifth embodiment. The passive optical network system shown in FIG. 29 includes an optical line terminal 10 having a terminal table 1041, an optical network unit 20 having a user terminal table 2043 and operating constantly in mode1, an optical receiver unit 30 capable of operating in either mode1 or mode2, optical fiber links 40 and an optical splitter 50 connecting the optical line terminal 10 with optical network units 20 by the tree topology, a copper line 90 and an optical fiber link 41 connecting the optical network unit 20 and the optical receiver unit 30, a service terminal 91 connected to the optical line terminal 10 and supplying service to the user side (user terminals), a second user terminal (UNI) 92 connected to the optical network unit 20 and receiving service from the service side (service terminal), and a first user terminal (UNI) 93 connected to the optical receiver unit 30 and receiving service from the service side (service terminal). The optical receiver unit 30, capable of changing its membership, operates in mode1 when its membership is valid, while operating in mode2 when its membership is invalid. For the optical network unit 20, all upstream/downstream messages/data are carried by the optical fiber link 40 and the optical splitter 50. Meanwhile, for the optical receiver unit 30, upstream messages/data (membership request message M21, membership cancellation message M22, pseudo upstream frame D2, etc.) are carried by a link formed by the copper line 90, the optical network unit 20, the optical fiber link 40 and the optical splitter 50, whereas downstream messages/data (membership acceptance message M11, membership rejection message M12, membership termination message M13, downstream frame D1, downstream broadcast frame D13, etc.) are carried by a link formed by the optical fiber link 41, the optical network unit 20, the optical fiber link 40 and the optical splitter 50.

Figure 30:
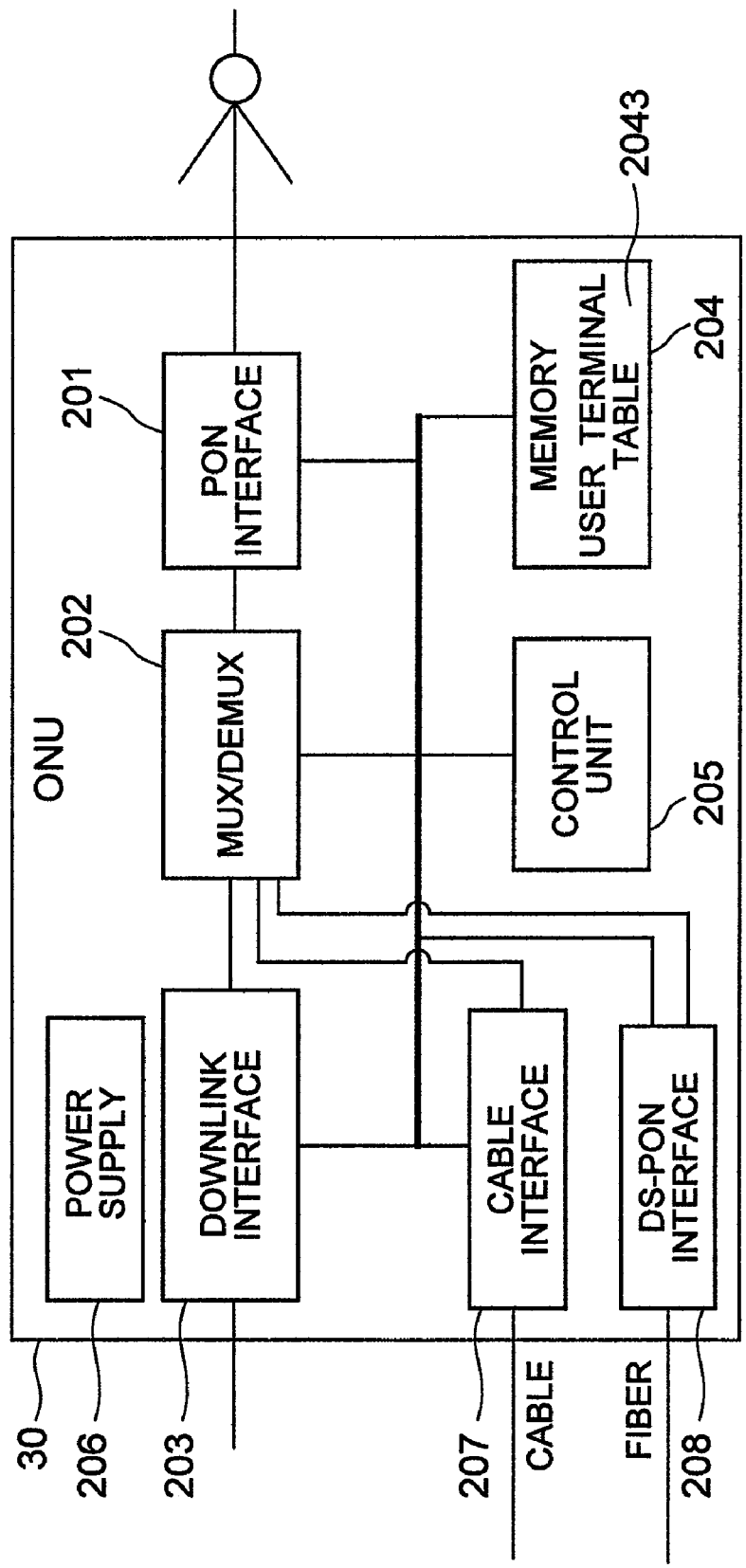
FIG. 30 is a block diagram of the optical network unit (connected to the copper line uplink and the optical downlink of the optical receiver unit) in accordance with the fifth embodiment of the present invention.

FIG. 30 is a block diagram of the optical network unit 20 (connected to the copper line uplink and the optical downlink of the optical receiver unit) in accordance with the fifth embodiment of the present invention. The optical network unit 20 includes a PON interface 201 connected to the optical fiber link 40 and communicating with the optical line terminal 10 connected to the link 40, a multiplexer/demultiplexer unit 202 for multiplexing/demultiplexing the upstream/downstream data, a downlink interface 203 for communicating with a UNI connected thereto, a memory unit 204 including the user terminal table 2043 for storing membership parameters of optical receiver units 30, a control unit 205 for controlling the operation of the other units/modules of the optical network unit 20 (e.g. update of the user terminal table 2043), a power supply 206 for supplying electric power to the units/modules, a copper line interface 207 connected to the cable 90 and executing the upstream communication with the optical receiver unit 30, and a DS-PON interface 208 connected to the optical fiber link 41 and executing the downstream communication with the optical receiver unit 30.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. An optical line terminal connecting with numbers of optical network units, wherein:
    the optical network units are connectable to the optical line terminal in a second mode, in which the optical network units are manageable and the transmission and reception of control messages are possible but the transmission of the data is impossible, when the number of optical network units connected to the optical line terminal in a first mode, in which transmission and reception of control messages and data are possible, exceeds a number preset to the optical line terminal as the maximum number of optical network units permitted to execute upstream data transmission from the optical network unit to the optical line terminal, and
    the optical line terminal comprises a control unit which controls each optical network unit to operate in the first mode or in the second mode, according to a communication permission request transmitted from an optical network unit and based on the maximum number of optical network units permitted to execute the upstream data transmission.

2. The optical line terminal according to claim 1, further comprising:
    a memory which stores a terminal information management table for storing optical network unit serial numbers for identification of the optical network units and membership parameters each of which indicates whether or not each optical network unit has authority to transmit data to the optical line terminal; and a network interface which receives the optical network unit serial number and a communication permission request message, requesting communication, from an optical network unit, wherein:

upon reception of the communication permission request message by the network interface, the control unit refers to the terminal information management table and thereby judges whether or not to make the requesting optical network unit switch from the second mode to the first mode allowing for data transmission.

3. The optical line terminal according to claim 2, wherein the control unit updates the terminal information management table upon the switching of the optical network unit from the second mode to the first mode or from the first mode to the second mode.

4. The optical line terminal according to claim 2, wherein when the optical network unit after the switching from the second mode to the first mode has not executed communication during a prescribed time period, the control unit switches the optical network unit from the first mode to the second mode and changes the membership parameter of the optical network unit in the terminal information management table from valid to invalid in response to a membership cancellation request from the optical network unit.

5. The optical line terminal according to claim 2, wherein the optical line terminal maintains the connection with the optical network unit in the second mode by periodically transmitting a discovery window to the optical network unit and receiving a response from the optical network unit.

6. The optical line terminal according to claim 5, wherein when no response to the discovery window is received from the optical network unit even when time counted by a timer exceeds a prescribed time period, the optical line terminal judges that the connection with the optical network unit has been lost and deletes the membership parameter item corresponding to the optical network unit from the terminal information management table.

7. The optical line terminal according to claim 1, further comprising a timer for counting a time period during which the upstream data transmission by the optical network unit is permitted, wherein:

the control unit makes the optical network unit switch from the first mode to the second mode when the timer has finished counting the time period during which the upstream data transmission by the optical network unit is permitted.

8. The optical line terminal according to claim 1, wherein:
a downlink for carrying communication control messages and data from the optical line terminal to the optical network unit is an optical fiber link, and
an upstream link for carrying communication control messages and data from the optical network unit to the optical line terminal is a communication link employing an air interface or a cable interface.

9. An optical network unit to be connected to an optical line terminal, wherein:

the optical network unit is connectable to the optical line terminal in a second mode, in which the optical network units are manageable and the transmission and reception of control messages are possible but the transmission of data is impossible, when the number of optical network units connected to the optical line terminal in a first mode, in which transmission and reception of control messages and data are possible, exceeds a number preset to the optical line terminal as the maximum number of optical network units permitted to execute upstream data transmission from the optical network unit to the optical line terminal, and the optical network unit comprises a control unit which controls the optical network unit to operate in the first mode or in the second mode, according to a response which is made by the optical line terminal to a communication permission request from the optical network unit based on the maximum number of optical network units permitted to execute the upstream data transmission.

10. The optical network unit according to claim 9, further comprising:
a memory which stores a terminal information management table for storing membership parameters each of which indicates whether or not each optical network unit has authority to transmit data to the optical line terminal; and
a network interface which transmits an optical network unit serial number and a communication permission request message, requesting communication, to the optical line terminal.

11. The optical network unit according to claim 9, further comprising a timer for counting a time period during which the upstream data transmission by the optical network unit is permitted by the optical line terminal, wherein:
the control unit switches the optical network unit from the first mode to the second mode when the timer has finished counting the time period during which the upstream data transmission by the optical network unit is permitted.

12. The optical network unit according to claim 11, wherein the control unit updates membership parameters, indicating whether or not the optical network unit has authority to transmit data to the optical line terminal, upon the switching of the optical network unit from the second mode to the first mode or from the first mode to the second mode.

13. The optical network unit according to claim 11, wherein when the optical network unit after the switching from the second mode to the first mode has not executed communication during a prescribed time period, the control unit transmits a membership cancellation request, requesting cancellation of the membership of the optical network unit, to the optical line terminal and switches the optical network unit from the first mode to the second mode.

14. The optical network unit according to claim 11, wherein the optical network unit maintains the connection with the optical line terminal in the second mode by responding to discovery windows which are periodically transmitted from the optical line terminal.

15. An optical line terminal connecting with numbers of optical network units, comprising:
a network interface connecting with optical network units exceeding a number preset to the optical line terminal as the maximum number of optical network units permitted to execute upstream data transmission from the optical network unit to the optical line terminal; and
a control unit which generates a communication permission response message, indicating whether the optical network operates in a first mode, in which transmission and reception of control messages and data are possible, or in a second mode, in which the transmission and reception of control messages and the reception of data are possible but the transmission of data is impossible, when an upstream data transmission permission request message and an optical network unit serial number are received from the optical network unit, wherein:

the network interface transmits the communication permission response message to the optical network unit transmitting the upstream data transmission permission request message.

16. An optical network system comprising an optical line terminal, an optical network unit and an optical link connecting the optical line terminal and the optical network unit, wherein:
- the optical network unit is connectable to the optical line terminal in a second mode, in which the optical network units are manageable and the transmission and reception of control messages are possible but the transmission of data is impossible, when the number of optical network units connected to the optical line terminal in a first mode, in which transmission and reception of control messages and data are possible, exceeds a number preset to the optical line terminal as the maximum number of optical network units permitted to execute upstream data transmission from the optical network unit to the optical line terminal, and
- the optical line terminal includes a control unit which controls the optical network unit to make it operate in the first mode or in the second mode, but the transmission of data is impossible, according to a communication permission request transmitted from the optical network unit and based on the maximum number of optical network units permitted to execute the upstream data transmission, and
- the optical network unit includes a control unit which controls the optical network unit to operate in the first mode or in the second mode according to a response which is made by the optical line terminal to the upstream data transmission permission request from the optical network unit based on the maximum number of optical network units permitted to execute the upstream data transmission.

17. A video service system comprising a video server, an optical line terminal, an optical network unit, an optical receiver unit and an optical link, wherein:
- the optical network unit operates in a first mode in which transmission and reception of control messages and data are possible, and
- the optical receiver unit is capable of operating either in the first mode or in a second mode in which the transmission and reception of control messages and the reception of data are possible but the transmission of data is impossible, and the optical receiver unit receives video service from the video server via the optical line terminal, and
- the optical receiver unit is connectable to the optical line terminal even when the number of optical receiver units connected to the optical line terminal exceeds a number preset to the optical line terminal as the maximum number of optical receiver units permitted to execute upstream communication from the optical receiver unit to the optical line terminal, and
- the optical line terminal includes a control unit which controls the optical receiver unit to make it operate in a first mode in which transmission and reception of control messages and data are possible or in a second mode in which the transmission and reception of control messages and the reception of data are possible but the transmission of data is impossible, according to a communication permission request transmitted from the optical receiver unit and based on the maximum number of optical receiver units permitted to execute the upstream communication, and
- the optical receiver unit includes a control unit which controls the optical receiver unit to make it operate in a first mode in which transmission and reception of control messages and data are possible or in a second mode in which the transmission and reception of control messages and the reception of data are possible but the transmission of data is impossible, according to a response which is made by the optical line terminal to the communication permission request from the optical receiver unit based on the maximum number of optical receiver units permitted to execute the upstream communication.

18. The video service system according to claim 17, wherein an upstream link for carrying communication control messages and data from the optical receiver unit to the optical line terminal is of the same type as a downlink for carrying communication control messages and data from the optical line terminal to the optical receiver unit.

19. The video service system according to claim 17, wherein:
- a downlink for carrying communication control messages and data from the optical line terminal to the optical receiver unit is an optical fiber link, and
- an upstream link for carrying communication control messages and data from the optical receiver unit to the optical line terminal is a communication link employing an air interface or a cable interface.

20. The video service system according to claim 17, wherein the optical receiver unit transmits communication control messages and data to the optical line terminal and to the video server via the optical network unit by connecting to the optical network unit.

21. An optical communication method for an optical network system including an optical line terminal, an optical network unit and an optical link connecting the optical line terminal and the optical network unit, wherein:
- the optical network unit is connectable to the optical line terminal in a second mode, in which the optical network units are manageable and the transmission and reception of control messages are possible but the transmission of data is impossible, when the number of optical network units connected to the optical line terminal in a first mode, in which transmission and reception of control messages and data are possible, exceeds a number preset to the optical line terminal as the maximum number of optical network units permitted to execute upstream data transmission from the optical network unit to the optical line terminal, and
- the optical line terminal controls the optical network unit to make it operate in a first mode or in a second mode, according to a communication permission request transmitted from the optical network unit and based on the maximum number of optical network units permitted to execute the upstream data transmission.

* * * * *